(12) United States Patent
Chukwu

(10) Patent No.: US 9,268,470 B2
(45) Date of Patent: *Feb. 23, 2016

(54) ADVANCE SECURITY GUN WITH ADVANCE CODING SYSTEM

(71) Applicant: Ahamefula Chukwu, Houston, TX (US)

(72) Inventor: Ahamefula Chukwu, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/999,259

(22) Filed: Feb. 3, 2014

(65) Prior Publication Data

US 2014/0338244 A1    Nov. 20, 2014

Related U.S. Application Data

(63) Continuation of application No. 13/986,397, filed on Apr. 26, 2013, now abandoned.

(51) Int. Cl.

| | |
|---|---|
| *F41G 5/06* | (2006.01) |
| *G06F 3/0484* | (2013.01) |
| *E05G 1/02* | (2006.01) |
| *F41G 3/00* | (2006.01) |
| *F41G 1/35* | (2006.01) |
| *F41A 17/06* | (2006.01) |
| *F41A 17/08* | (2006.01) |
| *F41A 27/06* | (2006.01) |
| *F41A 27/28* | (2006.01) |
| *F41G 3/16* | (2006.01) |
| *F41J 11/00* | (2009.01) |
| *G06F 3/0481* | (2013.01) |

(52) U.S. Cl.
CPC .............. *G06F 3/04842* (2013.01); *E05G 1/02* (2013.01); *F41A 17/063* (2013.01); *F41A 17/08* (2013.01); *F41A 27/06* (2013.01); *F41A 27/28* (2013.01); *F41G 1/35* (2013.01); *F41G 3/00* (2013.01); *F41G 3/165* (2013.01); *F41G 5/06* (2013.01); *F41J 11/00* (2013.01); *G06F 3/04817* (2013.01)

(58) Field of Classification Search
CPC ......... F41A 19/58; F41A 19/59; F41A 23/20; F41A 23/56; F41A 27/00; F41A 27/02; F41A 27/28; F41G 5/00; F41G 5/02; F41G 5/04; F41G 5/06
USPC ............. 89/27.3, 38, 39, 37.21, 41.01, 41.02, 89/41.03, 41.05, 41.15, 28.05, 28.1, 28.2; 42/1.01–1.05

See application file for complete search history.

(56) References Cited

U.S. PATENT DOCUMENTS

| | | | | |
|---|---|---|---|---|
| 1,198,557 | A * | 9/1916 | Knotts | 89/38 |
| 1,327,085 | A * | 1/1920 | Dawson et al. | 89/38 |
| 4,112,818 | A * | 9/1978 | Garehime, Jr. | 89/41.05 |
| 4,644,845 | A * | 2/1987 | Garehime, Jr. | 89/41.05 |
| 5,379,676 | A * | 1/1995 | Profeta et al. | 89/41.05 |
| 5,949,015 | A * | 9/1999 | Smith et al. | 89/41.05 |
| 6,237,462 | B1 * | 5/2001 | Hawkes et al. | 89/41.05 |
| 6,269,730 | B1 * | 8/2001 | Hawkes et al. | 89/41.05 |
| 6,415,542 | B1 * | 7/2002 | Bates et al. | 42/70.11 |
| 6,678,984 | B1 * | 1/2004 | Rapp et al. | 42/70.11 |
| 7,168,357 | B2 * | 1/2007 | Hodgkinson | 89/1.11 |
| 7,231,862 | B1 * | 6/2007 | Quinn | 89/41.05 |
| 7,836,811 | B1 * | 11/2010 | Gardner et al. | 89/40.04 |
| 8,363,376 | B2 * | 1/2013 | Abatemarco | 361/232 |

(Continued)

*Primary Examiner* — Jonathan C Weber

(57) ABSTRACT

Advanced security gun that works with Wi-Fi or GSM or any other special networks, and will not work when it is removed from the address installed by its provider. The gun will not point forward at anyone, except if it is operated by the user to point at any direction, when controlled wirelessly with a special module.

3 Claims, 26 Drawing Sheets

(56) References Cited

U.S. PATENT DOCUMENTS

| | | | |
|---|---|---|---|
| 2007/0039602 A1* | 2/2007 | Caspi | 124/74 |
| 2009/0026239 A1* | 1/2009 | Chenel | 224/401 |
| 2009/0120275 A1* | 5/2009 | Chukwu | 89/41.05 |
| 2010/0304874 A1* | 12/2010 | Abatemarco | 463/47.3 |
| 2014/0173962 A1* | 6/2014 | Goren et al. | 42/70.11 |
| 2014/0318426 A1* | 10/2014 | Chukwu | 109/23 |

* cited by examiner

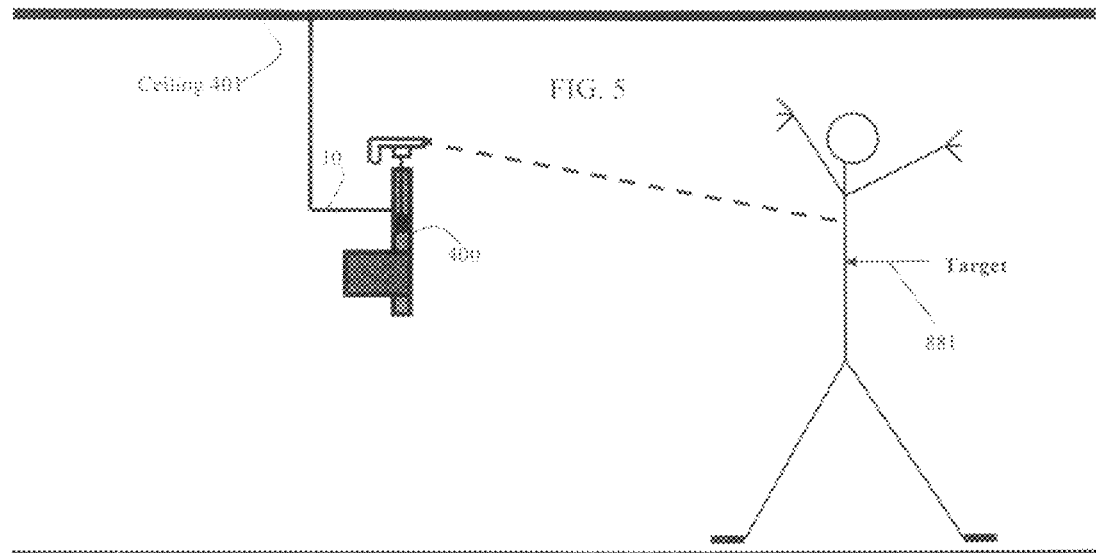
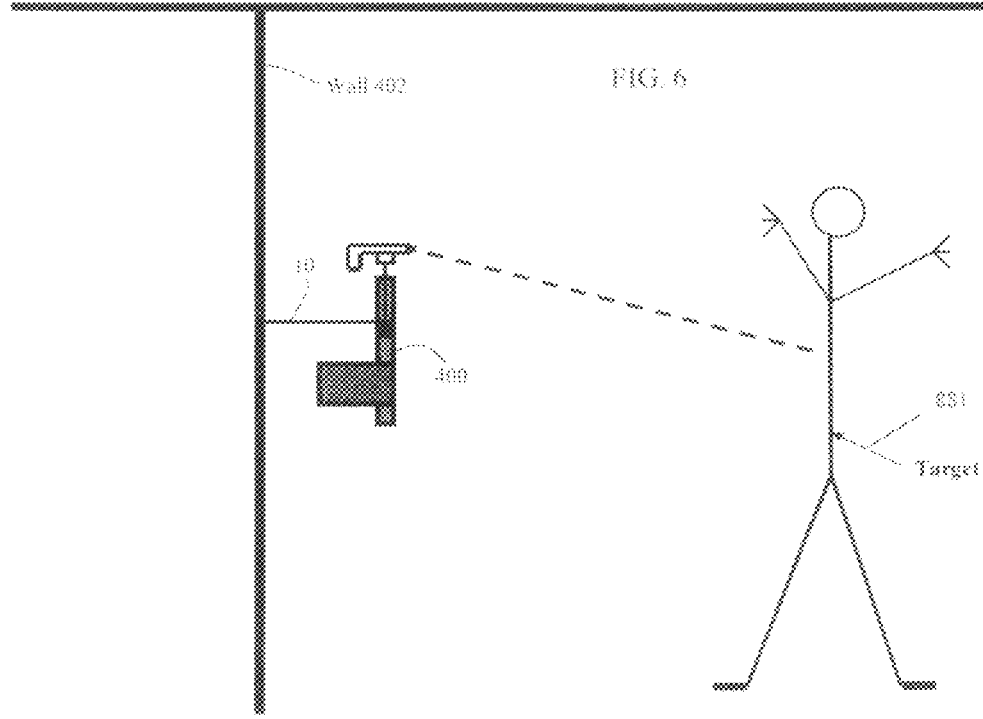

Safe hand held, control module 700G

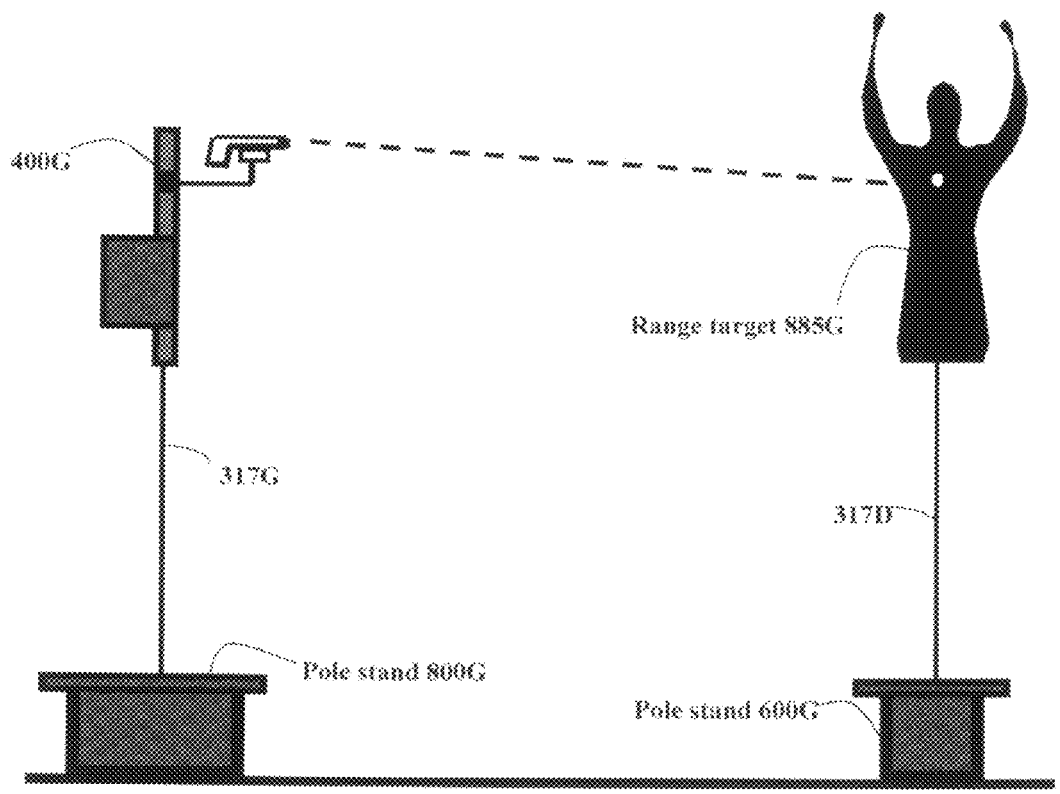

ADVANCE SECURITY GUN WITH ADVANCE CODING SYSTEM

The present invention is a continuation/modification of a previously filed patent application Ser. No. 13/986,397 filed Apr. 26, 2013.

BACKGROUND OF THE INVENTION

Field of Invention

The present invention discloses an advanced security gun. The present security gun is a high-tech gun. It works with Wi-Fi or GSM network. It can also work with any other special wireless telecommunication or internet networks. The present security gun has only two moving joints, and the joints are very effective in positioning the gun when controlled by the user wirelessly. The security gun will not work when it is removed from the address installed by the provider. The gun does not point forward at a target, except if it is operated by the user to point. The security gun comes with an embodiment that comprises a movable metal hand on which the gun is completely installed. The gun has a safety compartment; a compartment that is specially designed on its embodiment to conceal the gun. The gun can be placed in its safety compartment by the user remotely operating the metal hand and can be drawn out by the user wirelessly operating the metal hand, to be drawn out of the safety compartment to point the gun to any segment and direction when aiming or firing at a target. The gun is operated by the user wirelessly in real time with the use of a special internet connectable module also called coding system.

The present security gun is advanced because the user is able to control the embodiment of the security gun to point at any direction by wirelessly moving only two joints in the embodiment of the security gun. There are many other unique features that come with the present invention.

SUMMARY OF THE INVENTION

The present invention is a security gun. The security gun can only be operated with the use of a special internet connectable module called coding system. The coding system comes with a safe external hand held control module used for controlling the gun. The security gun cannot be operated with a commonly known computer. The security gun can only be operated with the use of a special module called coding system. The coding system has some special buttons designed for operating the security gun when pushed by the user. There are many features that make the security gun very safe which are explained in the drawings. The security gun will provide the topmost security in the event of an emergency like terrorist attacks in public or private property. The security gun has many areas it can be used, for example, to protect homes, shopping malls and property. Users of the security gun will pay service fees to enjoy the safety and security of the security gun. The security gun can also be used for protecting governmental structures and for military combat.

The coding system can connect to the security gun wirelessly from a set or authorized location. The coding system connects to the security gun automatically when a numeric code assigned to the security gun is entered to a monitoring internet site displayed on the monitor in coding system. The monitoring internet site is a secure site and it is called in this writing the security gun website. This website can also come in any other name. When the numeric code is entered into the security gun website, a real time video of the location where the security gun is mounted is displayed on the coding system. A trained law enforcement officer, a security guard, or any person authorized or assigned to operate the coding system can easily take action on a suspect(s) by using the coding system to operate the security gun in real time with the use of a safe hand held module when there is an emergency.

The present invention is particular to a security gun that can be operated from anywhere with the use of a special internet connectable module that comes with special software and design that make it impossible to be hacked.

The security gun is specially designed for security service, for example, in the event of an emergency like mall attacks, an ongoing armed robbery in a shop, or in the case of home invasions, etc.

The security gun can fire different kinds of bullets or ammunitions, for example, live bullets or blank bullets. The security gun can fire ammunitions that can cause injury or death. (2) The security gun can fire ammunitions that cause sleeping or temporary paralysis. (3) The security gun can fire ammunitions that deliver a painful punch, but will not cause death. (4) The security gun can fire ammunitions that deliver high voltage to the human body, but do not cause death. (5) The security gun can fire ammunitions that deliver unpleasant gas, for example, tear-gas. (6) The security gun can fire ammunitions that deliver paint stains to the human body or clothing, for example, if the security gun is used in movies or for training purpose.

The security gun comes with many other inbuilt features, for example: (1) three cameras for aiming and monitoring a target visually, (2) a laser pointer for accurate aiming of shot(s) (3) a loud speaker for communicating with anybody in the location of the security gun, (4) two microphones that detect any sound in the location where the security gun is mounted, (5) a flashing light that flashes two or three colors of light and can be turned ON or OFF by the user, and, (6) a special pole stand that has an inbuilt battery to power the security gun.

When emergency arises, officers/users monitoring the security gun website can take action on the suspect(s) from anywhere by using the coding system to operate the security gun to fire shot(s) at the suspect(s) before any security officer(s) or police officer(s) dispatched to the location can get to the emergency location. The officers monitoring the security gun website can communicate with the suspect(s) through the speaker on the embodiment of the security gun, and they can listen to any one in the location of the security gun through the microphone in the embodiment of the security gun. Officers using the coding system can negotiate with the suspect(s), for example, a bank robber or a person committing a crime in the location of the security gun.

The security gun is designed with the best quality of electronics, electrical, and mechanical parts and materials.

The service of the security gun will create a new security company that will give jobs to qualified job seekers and will make the society a safer place. The security gun will also create new jobs in the gun range industry, for example, online gun range that will allow people to practice in real time, by using the coding system to operate the security gun shooting at a target in a location set up by the provider or an agent that provides the service of the security gun.

BRIEF DESCRIPTION OF THE DRAWINGS

FIGS. 1 to 8 describe the embodiment of the security gun and how it is mounted and how it works.

FIG. 27 describes the use of the security gun on a real time gun range and how it works.

DETAILED DESCRIPTION OF THE PREFERRED EMBODIMENT

Figure 1:
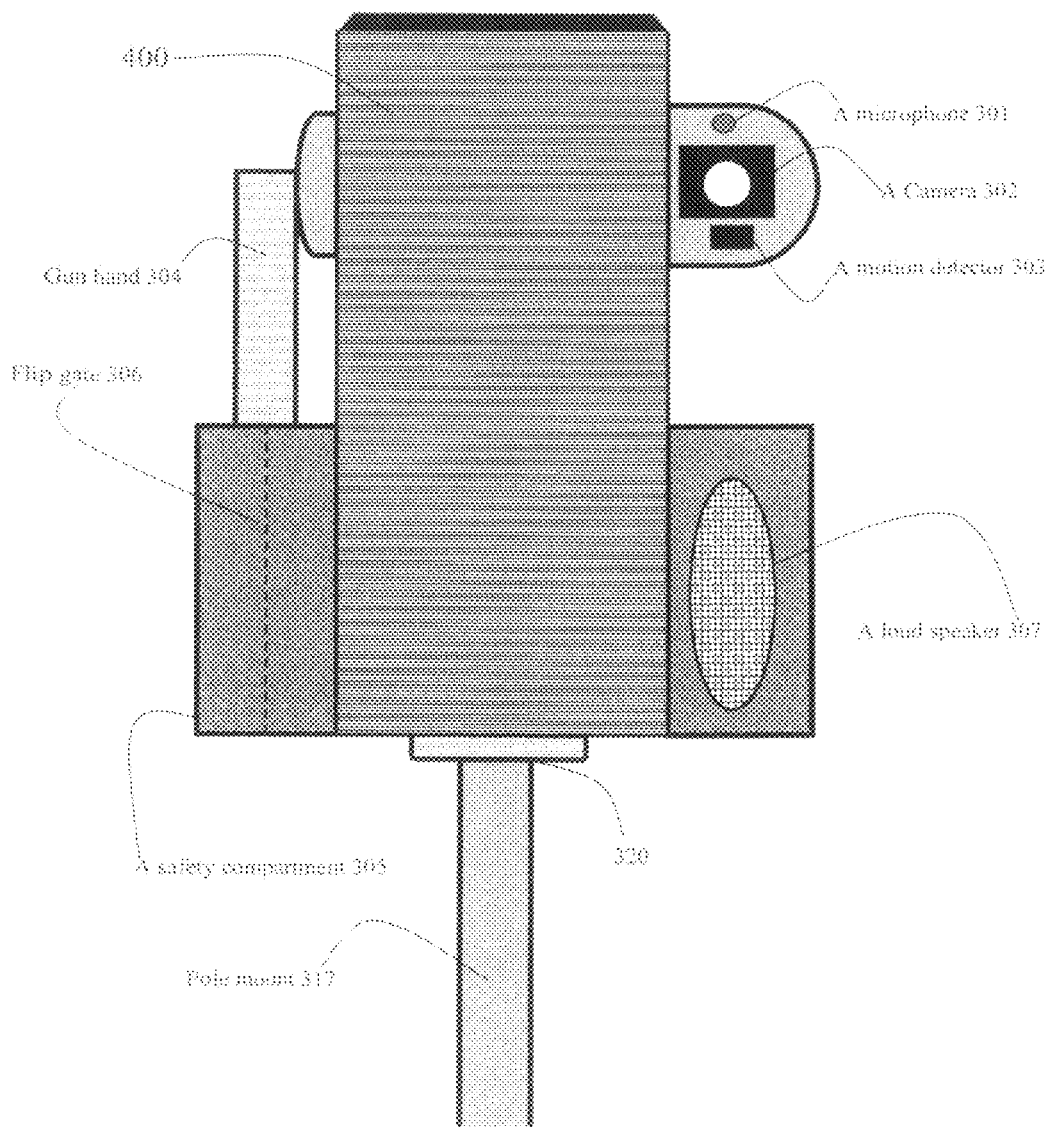

FIG. 1 is an embodiment of the security gun 400G. The security gun 400G comes with 3 cameras that monitor video images of the area where the security gun 400G is mounted. The video images are automatically sent in real time through the internet to be received by the coding system 500G. The security gun 400G also comes with inbuilt microphones 301A and 301B and a loud speaker 307G. The security gun 400G also comes with many other inbuilt features on its embodiment: a flashing light 402A, a loud speaker 307G, some cameras, and a safety compartment 305G. All these features are on the embodiment of the security gun 400G. Furthermore, in FIG. 1, the gun hand 304G is placed in the safety compartment concealing the gun. A flip gate 306G on the front of the safety compartment 305G opens and closes as the weight of the gun pushes and as the gun hand is controlled to be placed or drawn out from the safety compartment. Furthermore, in this drawing are two arrows A5 and A6 indicating that the embodiment of the security gun 400G can turn to any direction up to 360 degrees from the left or from right on a pole 317G when controlled by the user. The turning ability of the embodiment of the security gun 400G will allow the user to turn the embodiment of the security gun to any direction easily and fast when monitoring or aiming a target. A joint area 320G or 320B in the embodiment of the security gun 400G enables the security gun 400G to turn on a pole 317G when controlled by the user and a brake system inside the embodiment of the security gun 400G stops and holds the embodiment of the security gun 400G immediately after the user stops controlling the movement of the embodiment of the security gun 400G.

Figure 2:
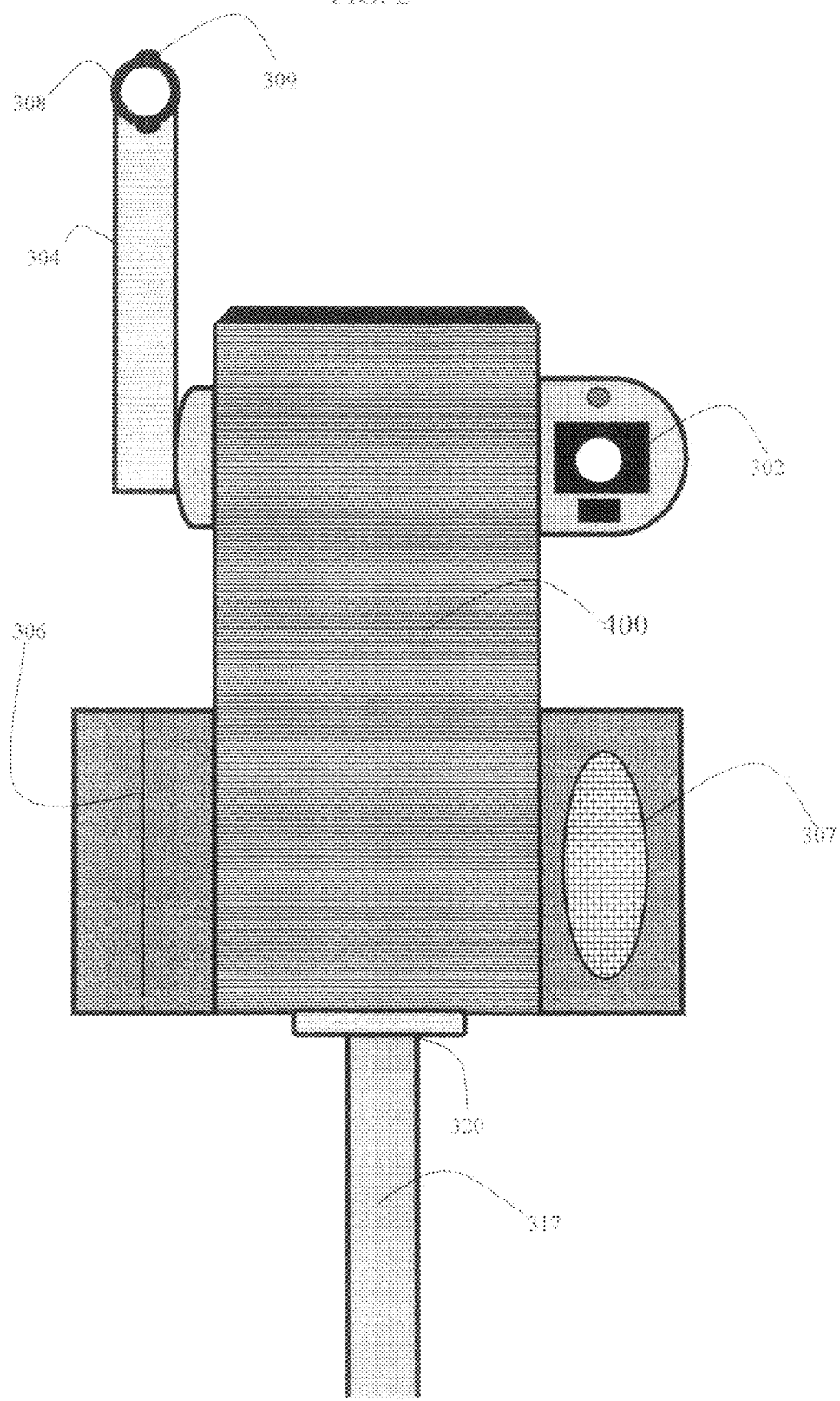

FIG. 2 is an embodiment of the security gun 400G. The embodiment of the security gun 400G will come in different grades or quality, meaning that the embodiment of the security gun 400G can come with one or two inputs for installing a pole depending on the choice of the grade of the customer. The area for installing a pole will also depend on where it will be mounted, for example, if the security gun 400G will be mounted on a pole stand, it will be built to have only the 320G area for installing a pole. Furthermore, if the security gun 400G will be mounted on the ceiling with a pole, then it will be built to have only the 320B area for installing a pole. The embodiment of the security gun 400G can be made with a thick metal, and it can also be made with plastic and other special material depending on the grade of the security gun 400G. The security gun 400G has three cameras on its embodiment: a front camera 302A, a back camera 302B, and a camera 309G mounted on the embodiment of the gun 308G. See FIG. 3. Cameras 302A and 302B are two side cameras and are mounted on the embodiment of the security gun 400G. The cameras 302A and 302B are in constant use when the gun 308G is in its safety compartment, except when the gun 308G is operated by the user to be drawn out of the safety compartment. Then the cameras 302A and 302B will stop working and the camera mounted on the embodiment of the gun 309G automatically starts working, replacing camera 302A and 302B. The user can select the camera 302A, if the user want to continue using the front camera 302A, even if the gun 308G is drawn. See FIG. 17.

FIG. 2 shows the back side of the embodiment of the security gun 400G. Here is the camera 302B, the microphone 301B, the flashing light 402B, a back cover 501G, and some lock screws at the side of the back cover 502G. The back cover 501G is a removable part on the embodiment of the security gun 400G that covers an opening in the embodiment of the security gun 400G, and it can be removed by unscrewing the lock screws 402G at the sides of the back cover 501G to unveil the internal parts of the security gun 400G. The internal parts of the security gun 400G consist of electronic circuits, electrical, and mechanical components and parts.

Figure 3:
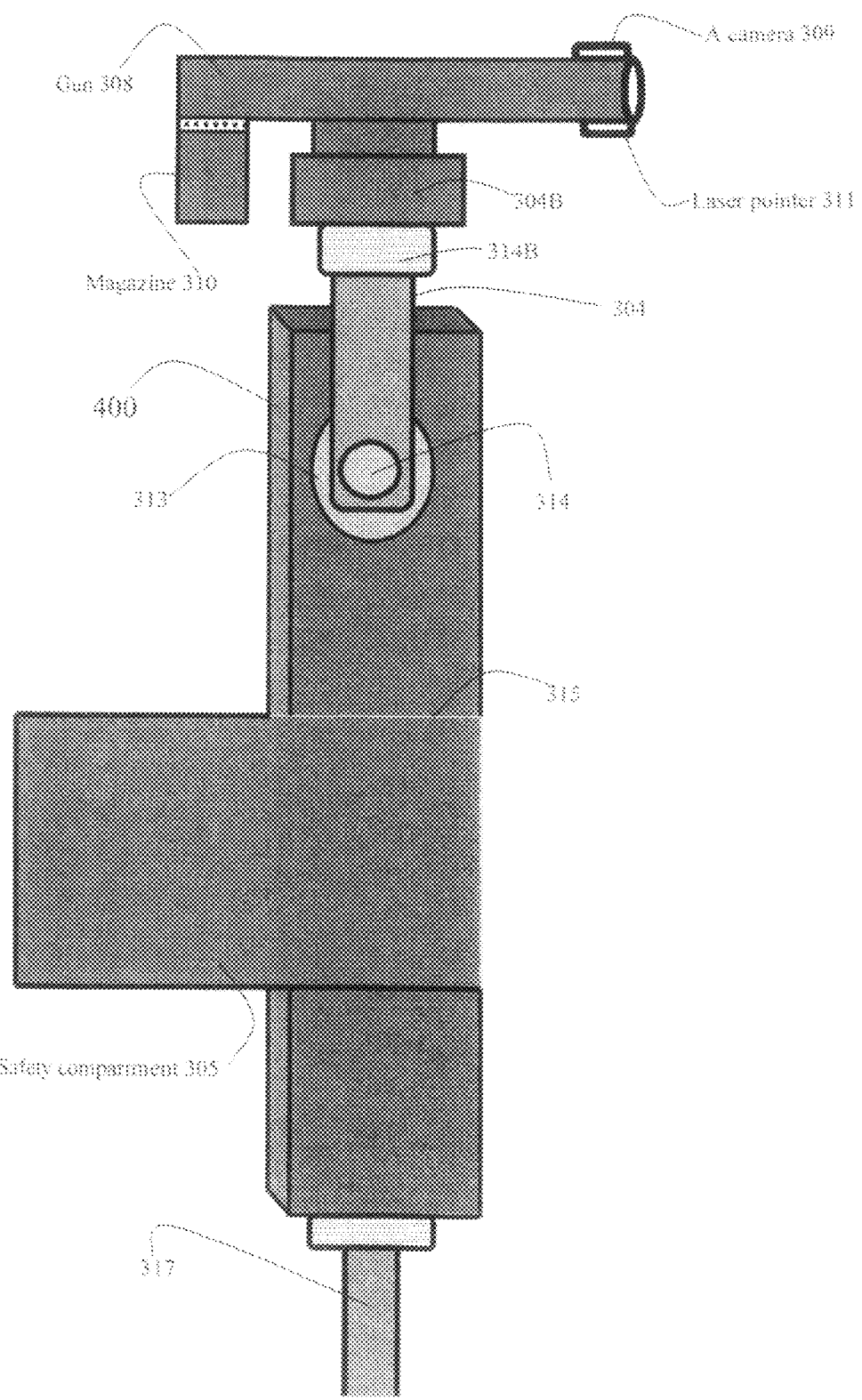

FIG. 3 is the side view of the embodiment of the security gun 400G. The gun 308G in the security gun 400G cannot be fired by a human hand. It is completely installed to its hand 304B. In this drawing, the gun 308G is operated out of its safety compartment. The user can remotely operate the embodiment of the security gun 400G to move around on a pole 317G to any position 360 degrees. There are two inputs for installing a pole 317G in the embodiment of the security gun 400G: one is input 320B and the other is input 320G. A pole 317G can be installed in any of the two inputs in the embodiment of the security gun 400G, and both input allows the embodiment of the security gun 400G to move around on the pole 317G when controlled by the user.

The user can control the gun hand 304A to move to any segment upward or downward. The movable joints 314G are connected to a joint area 313G inside the embodiment of the security gun 400G, which consists of mechanical parts that are built with many special parts like cranks, joints, bearings, a brake system, electric motors, and many other special mechanical and electrical parts that enable the user to move and control the embodiment of the security gun 400G. Also the user can control the gun hand 304A to move to any position of the user's choice. The gun hand 304A can be moved to any segments upward or downward, while the movable joints 320G and 320B enable the user to control the embodiment of the security gun 400G to move around to any direction 360 degrees on a pole 317G. Any direction also means from the left or from the right. A brake system inside the embodiment of the security gun 400G stops and hold the joints 320G or 314G from moving immediately after the user stops controlling the movement of the joints 320G or 314G. The brake system allows the joints to remain in their position after movement. See FIG. 3 for the labelling of the joints 314G and 320G and another joint 320B that has area for inserting a rod or pole. See FIGS. 15, 16, and 17 for explanation on how the user controls the said joints.

Furthermore, FIG. 3 shows two arrows A5 and A6 indicating that the user of the security gun 400G can control the embodiment of the security gun 400G to turn to any direction up to 360 degrees from the left or from right on a pole 317G. The turning ability of the embodiment of the security gun 400G will allow the user to turn the embodiment of the security gun 400G to any direction easily and fast when monitoring or aiming a target. The user can also control the security gun hand to point to any segment upward or downward or place the gun hand 308G into its safety compartment 305G. The security gun hand 304A has a part 304B on which the gun 308G is completely installed. The part 304B further comprises of parts that trigger or ignite the gun 308G to fire bullet(s) when controlled by the user. Here is the gun magazine 310G. The magazine 310G can hold many bullets. So many different types of magazine 310G are configured to hold different types of ammunitions that can be inserted into the gun 308G. The provider/user will slide a part 403G in order for the ammunitions/bullets to be loaded into the gun 308G. The security gun hand 304A can also be made hydraulic powered hand 304A with many special mechanical parts.

Figure 4:
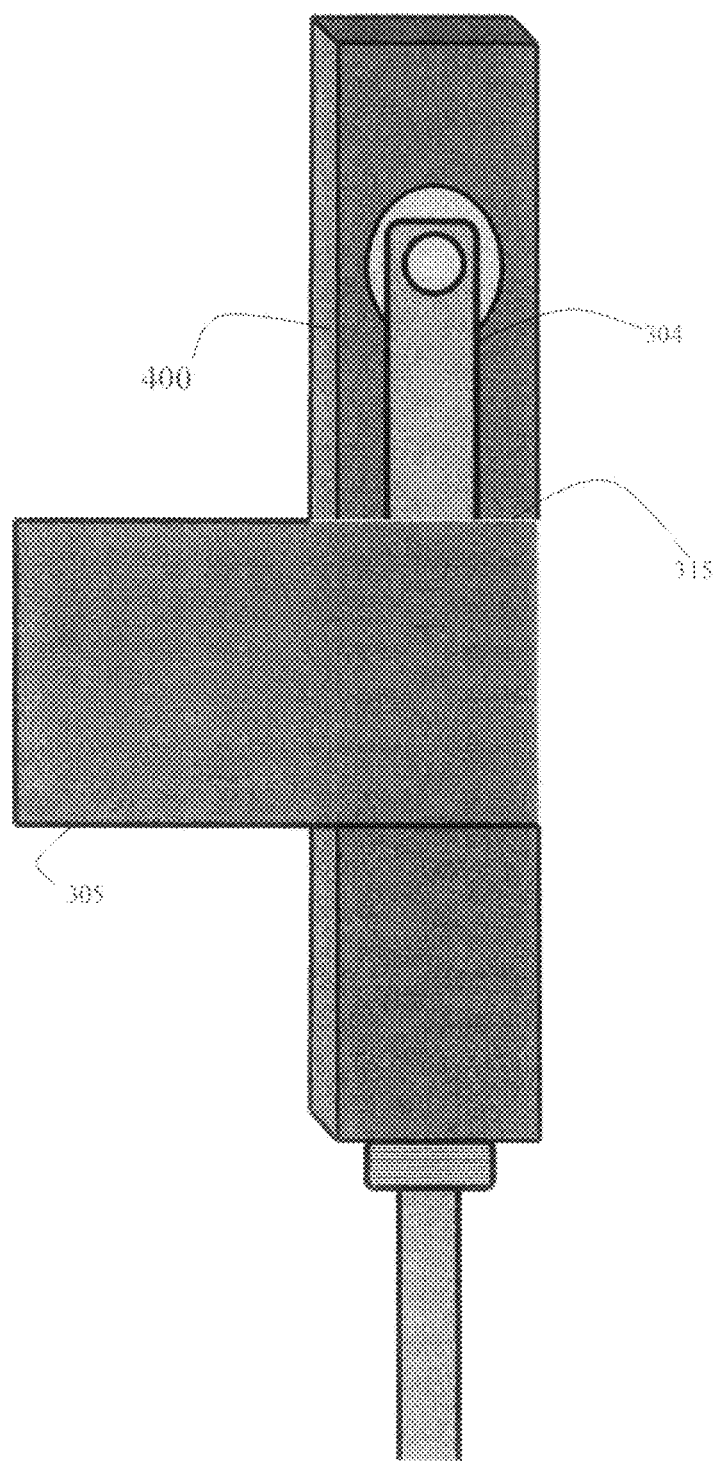

FIG. 4 is an embodiment of the security gun 400G. In this drawing, the security gun hand 304A is moved by the user to its safety compartment 305G. The safety compartment 305G has an opening 315G through which the gun 308G enters, and a flip gate 306G is designed to close when the gun 308G is completely inside. See FIG. 2. The flip gate 306G is designed to open when the weight of the gun 308G is applied on the gate. The flip gate 306G opens by the weight of the gun 308G going into its safety compartment 305G and closes back when the gun 308G is completely inside its safety compartment 305G. The opening 315G in the safety compartment enables the gun 308G to be placed into the safety compartment 305G, which has no difficulty concealing the gun 308G. The safety compartment 305G and the flip gate 306G are made with metals. The flip gate is made with metal plates that are connected to joints and springs and it is located on the embodiment of the safety compartment, which is located on the embodiment of the security gun 400G.

FIG. 5 is an embodiment of the security gun 400G. In this drawing, the security gun 400G can be mounted on the ceiling 401 with the use of a rod 317G connected to the pole area 320B in the embodiment of the security gun 400G. The gun 308G is brought out of its safety compartment and it is pointed at a target 881. The security gun 400G is mounted in this manner in special location indoor or outside, for example, in malls, public or private properties, business premises, homes, prisons, military or air force bases.

FIG. 6 is an embodiment of the security gun 400G. This drawing shows the security gun 400G can be mounted on the wall 402 with the use of a rod 317G connected to the pole area 320G in the embodiment of the security gun 400G. The gun 308G is brought out of safety compartment and it is pointed at a target 881G. The security gun 400G is mounted in this manner in special location indoor or outside, for example, in industrial buildings, public or private properties, business premises, homes, prisons and more.

Figure 7:
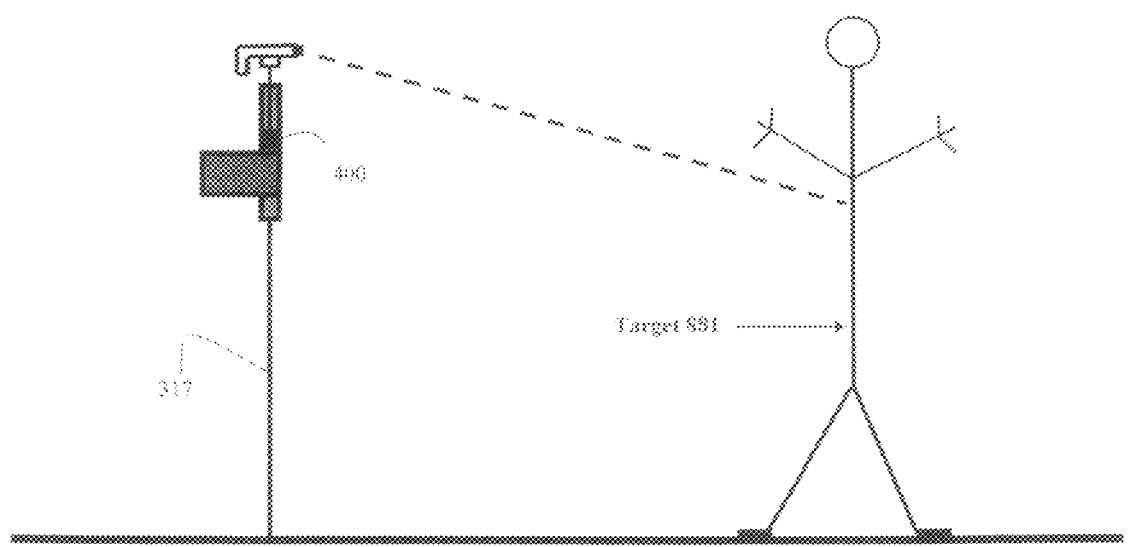

FIG. 7 is an embodiment of the security gun 400G. In this drawing, the security gun 400G can be mounted on a pole 317G with a stand 800G placed on the ground in a parking lot or in a public or private place, inside or outside a building, for example, homes, malls, shops, warehouses or industrial properties. The pole stand 800G has an inbuilt rechargeable battery that powers or backs up the security gun 400G and a handle 420G that makes it easy for the user to relocate the security gun 400G to any location or position, and can easily be used by police officers during standoff shootings.

Figure 8:
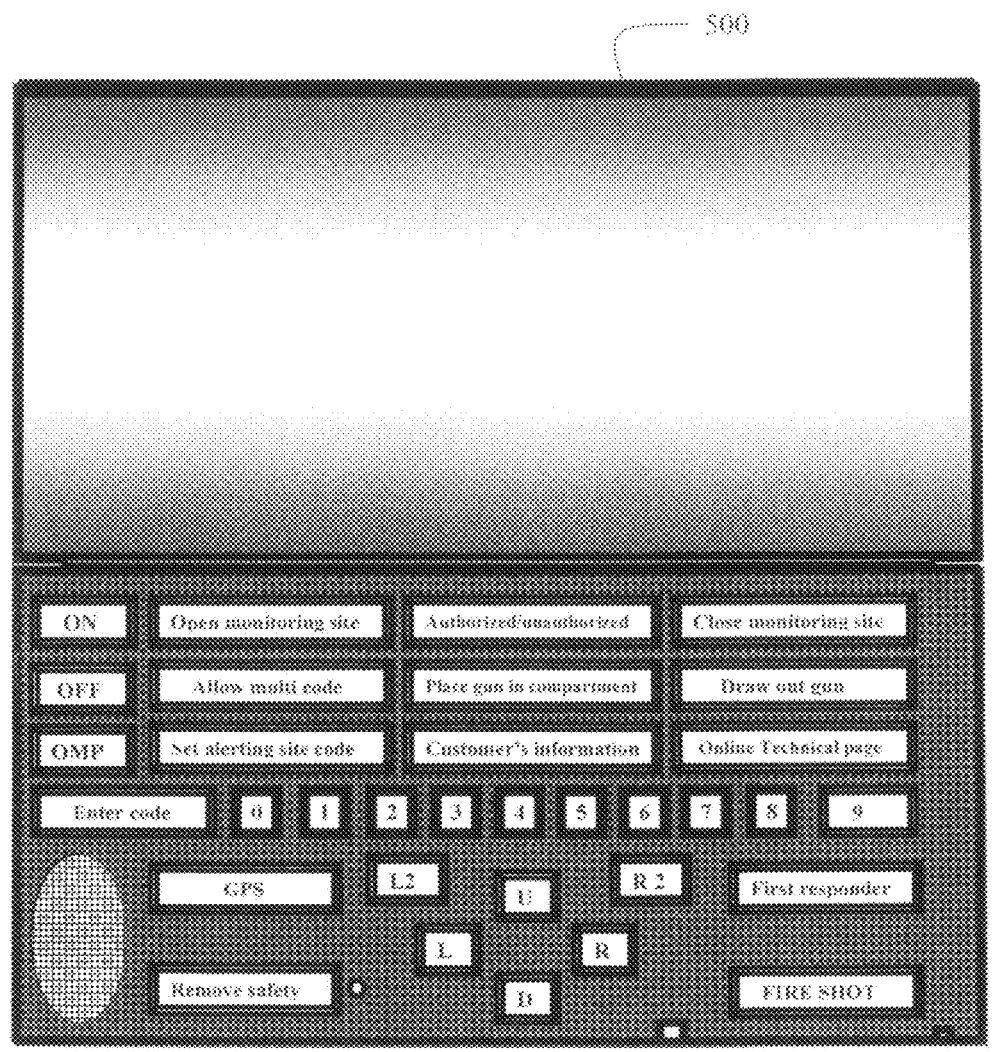

FIG. 8 is an embodiment of the security gun 400G. In this drawing, the security gun 400G can be mounted on a pole 317G placed on the ground in a parking lot or in a public or private place, inside or outside a building, for example, homes, school, malls, office or shops. The drawings of the security gun 400G from FIGS. 1 to 8 show the embodiment of the security gun 400G mounted on a pole 317G and a part to insert the pole 320B or 320G. See FIG. 3. The pole 317G can be mounted on the ground, floor, a stand, and electrical circuits, and wires that power the security gun can be sent through the pole, if the pole is a pipe type of pole with a hole in the middle.

Figure 9:
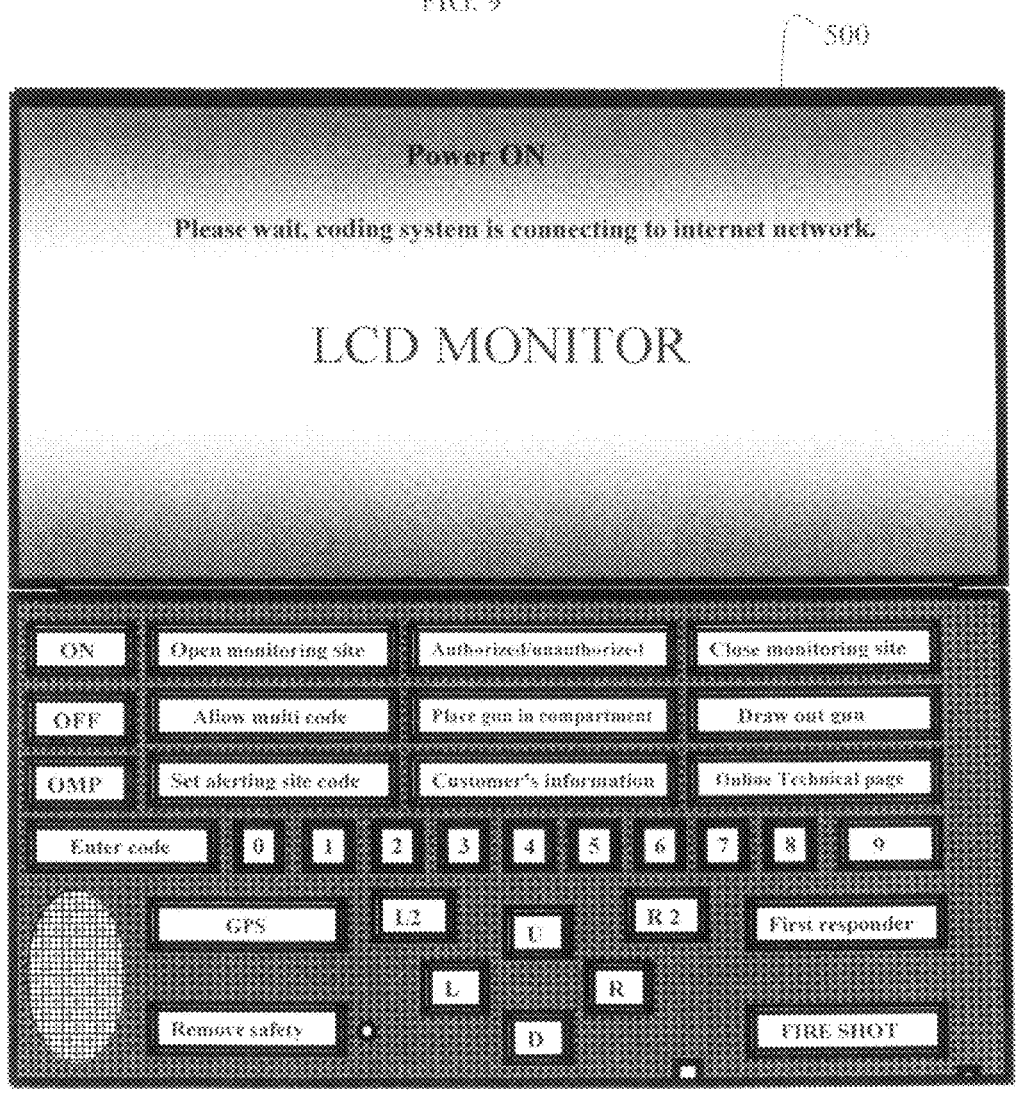
FIGS. 9 to 25 describe the embodiment of the coding system and the method of operating the security gun using the coding system and the safe hand held module.

FIG. 9 is an embodiment of the security gun operating module 500G also called coding system 500G. The coding system 500G is a flip monitor, a flip-able coding system 500G, meaning that the embodiment of the coding system 500G can be flipped open or close by the user. The coding system 500G can be powered by AC power supply or a rechargeable battery that will back up the coding system 500G. The coding system 500G is specially designed for operating the security gun 400G and it uses Wi-Fi, GSM, or any other special networks. The coding system 500G is very safe because it comes with some special buttons that are user friendly and very easy to use and identify. The buttons are listed as follows: [1] Open monitoring site [2] Enter code [3] Close monitoring site [4] Power ON/OFF [5] Technical page [6] First responder [7] ON/OFF siren [8] SW [9] Customer information [10] Service request [11] Clear code [12] OMP [13] Microphone [14] Authorized [15] ON/OFF Light [16] Front camera [17] Monitor multiple security guns [18] GPS [19] Key ON/OFF. The coding system 500G also comes with other regular numeric buttons labeled 0 to 9 and other special inbuilt features: a headset input, an inbuilt speaker, infrared detectors, a camera, and a microphone.

The coding system 500G comes with an inbuilt color LCD monitor. These features are easily seen on the embodiment of the coding system 500G without any special labelling. The functions of the listed buttons will be explained from FIGS. 10 to 25.

Figure 10:
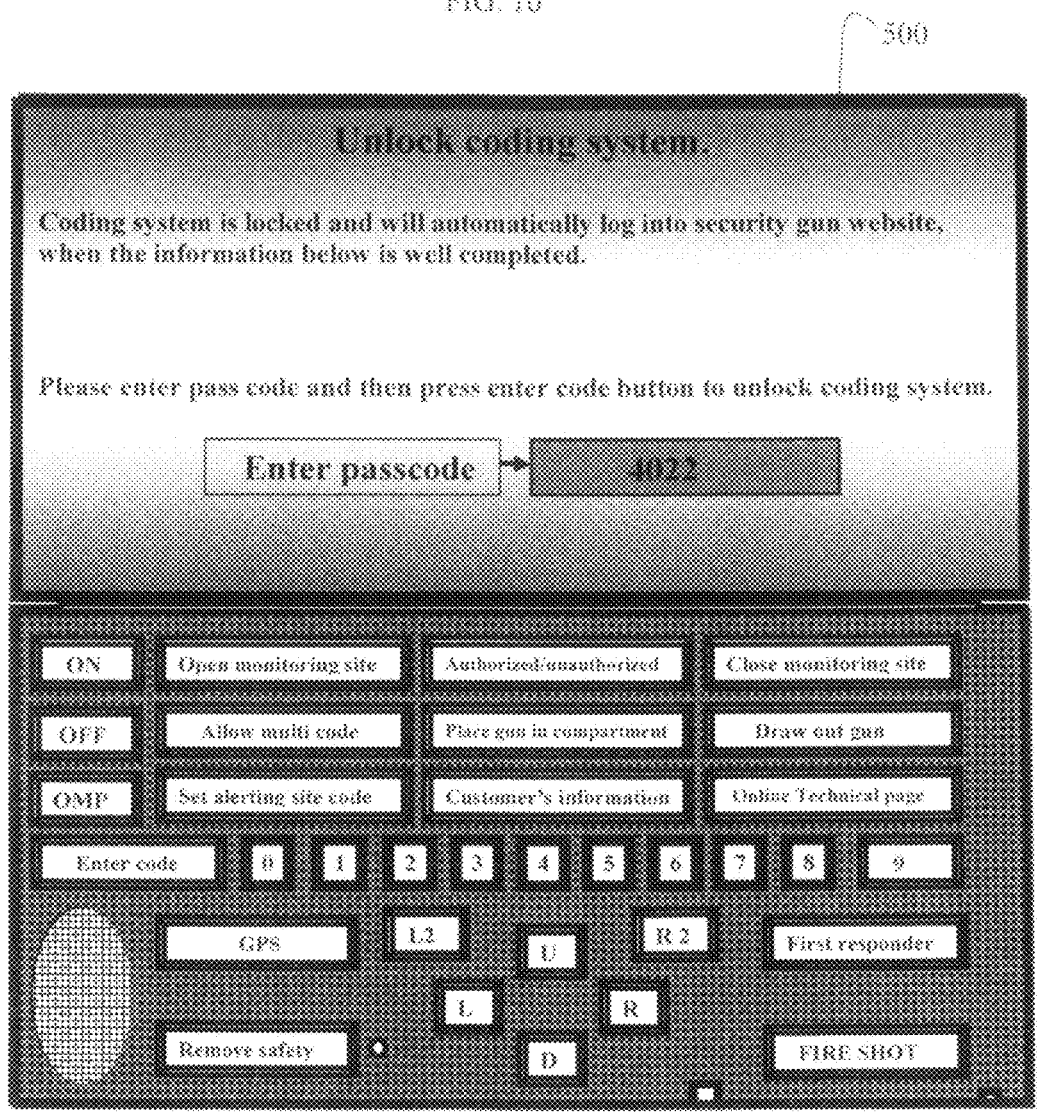

FIG. 10 is the embodiment of the coding system 500G, used for operating the security gun 400G. In this drawing, the coding system 500G is turned ON by the user pushing the power ON/OFF button. The LCD monitor displays power ON, Please wait, coding system is connecting to network.

Figure 11:
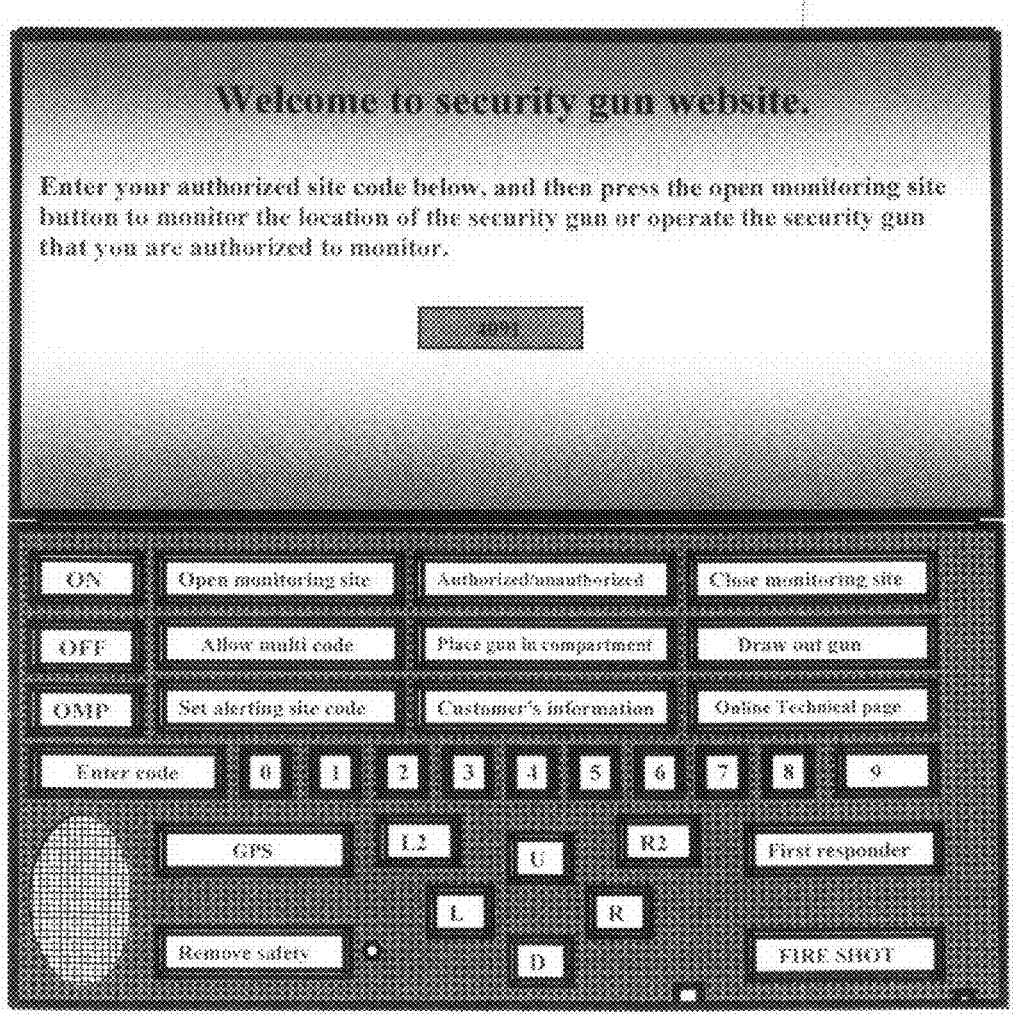

FIG. 11 displays the program saying coding system is locked and will automatically log into security gun website when the information below is well completed. The user must enter a special numeric code provided by the security gun 400G provider to unlock the coding system 500G. When the coding system 500G is unlocked, the coding system 500G will automatically display the security gun website, a website used for controlling the security gun 400G as well as monitoring the location where the security gun 400G is mounted. The website is also used for operating the security gun 400G, and for receiving data information about the security gun 400G. Numeric codes are entered using the 0 to 9 buttons located on the embodiment of the coding system 500G. The user can erase any incorrect code by pushing the clear code button on the embodiment of the coding system 500G. The correct numeric codes unlocks the coding system when the user pushes the enter code button on the embodiment of the coding system 500G.

Figure 12:
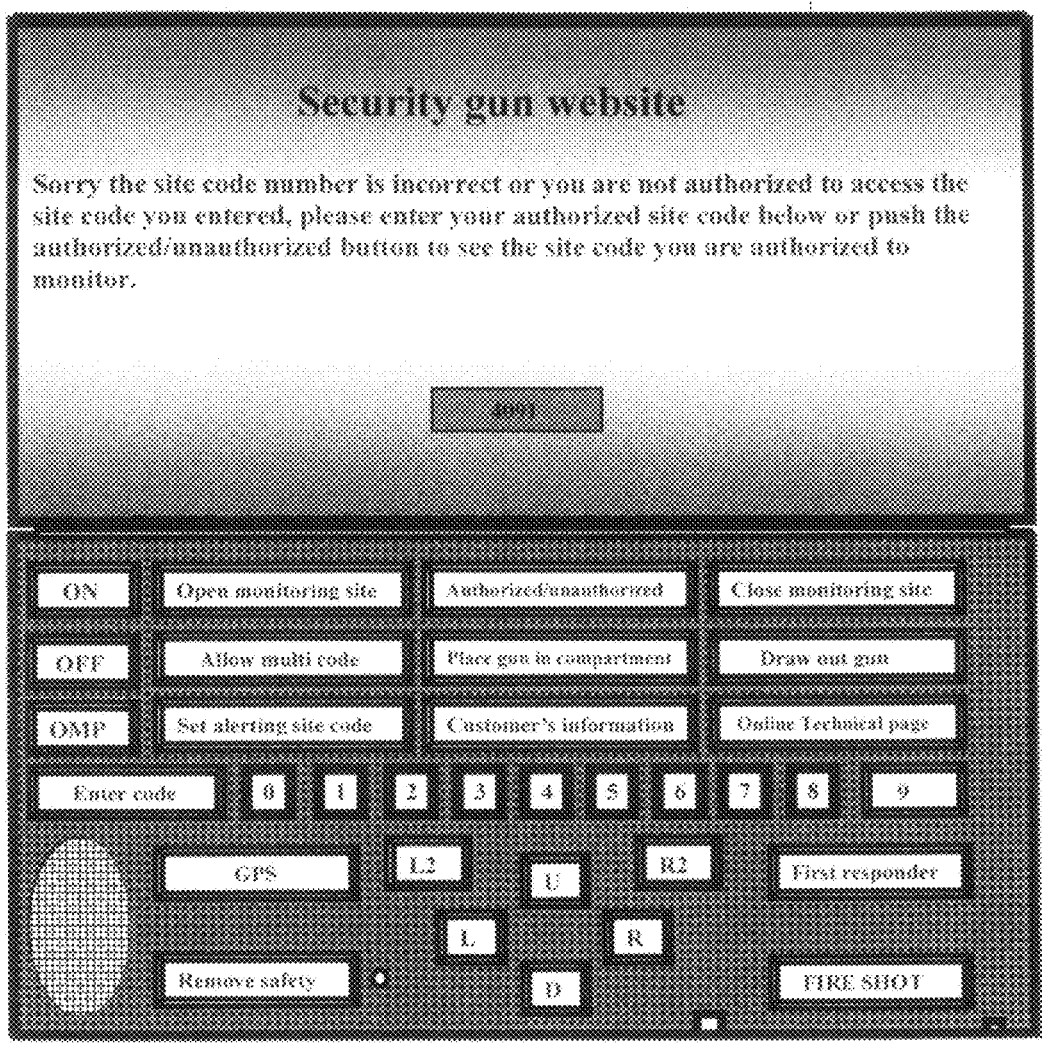

FIG. 12. The coding system 500G displays the program, welcomes the user to security gun website, then the user is asked to enter authorized site code. Therefore, each security gun 400G has a pre-assigned site code. The site code of a security gun can only be changed by the provider. The site code is used for gaining access into the monitoring site of a particular security gun 400G. Therefore, to gain access also means to operate the security gun 400G to monitor the location where the security gun 400G is securing, or to check data information about the security gun 400G. The user enters the site code using the numeric buttons numbered 0 to 9 on the embodiment of the coding system 500G and then the user presses the open monitoring site button to monitor the location of the security gun 400G or to operate the security gun 400G that the user is authorized to monitor. The site code can be a 4 to 10 digit or more set of numbers.

Figure 13:
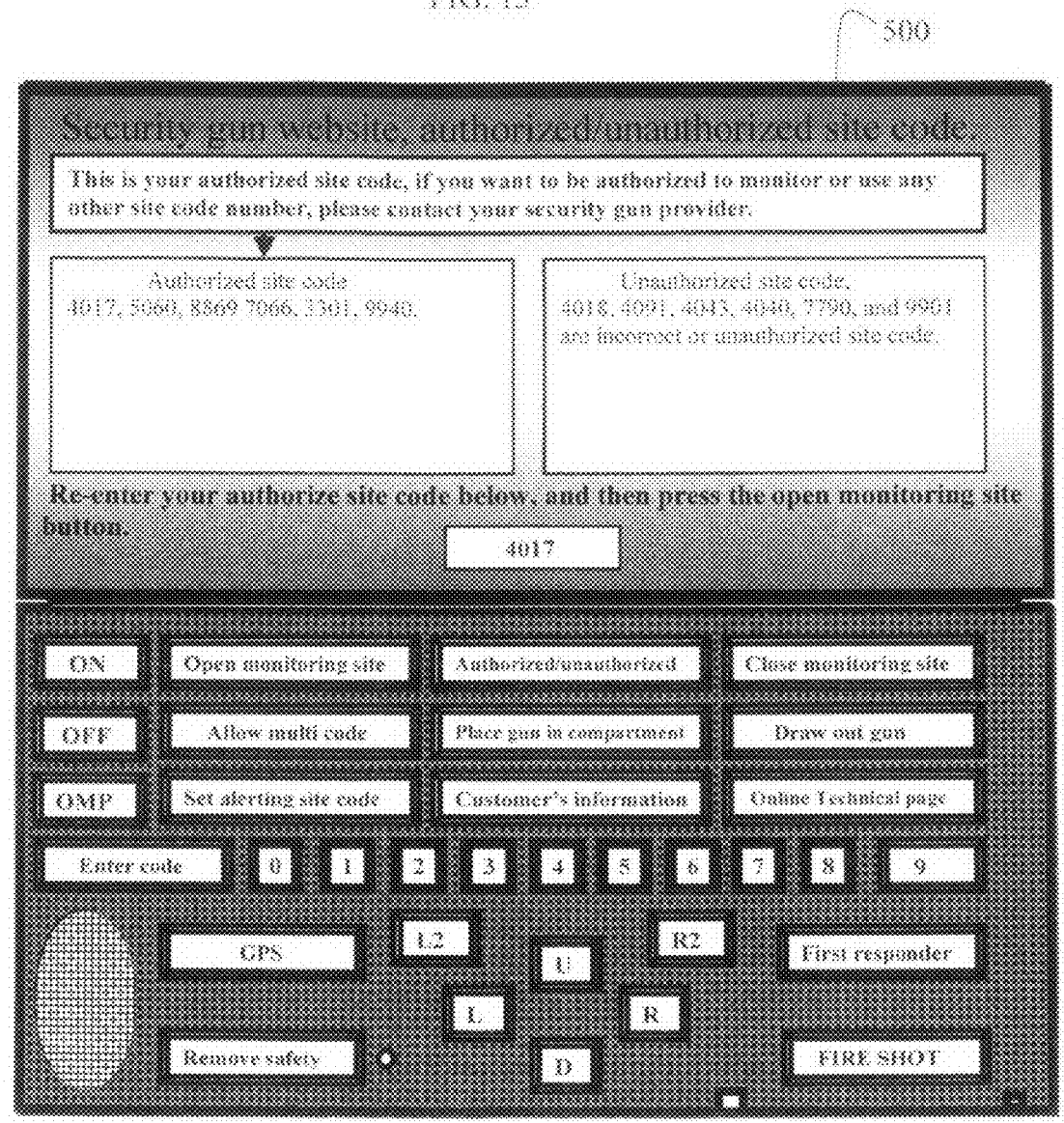

FIG. 13. The coding system 500G displays the program, sorry the site code number you entered is incorrect, or this coding system 500G is not authorized to access the site code you entered, please enter your authorized site code below or push the authorized site code button to see the site code you are authorized to monitor. More information is displayed on the monitor notifying the user with the following sentence:

you can also push the service request button to communicate with a supervisor if you have any needs. If the user enters the wrong site code or the site code entered by the user is not authorized to be used in the coding system 500G, the coding system 500G will not accept the site code. The providers are the agents or companies that provide the service of the security gun 400G. The provider pre-programs all coding system 500G through the security gun website to accept only the authorized site code. Furthermore, the provider can program any coding system 500G to be tracked by GPS or to only work within the country or company premises or area that the provider wants the users to operate the coding system 500G.

Figure 14:
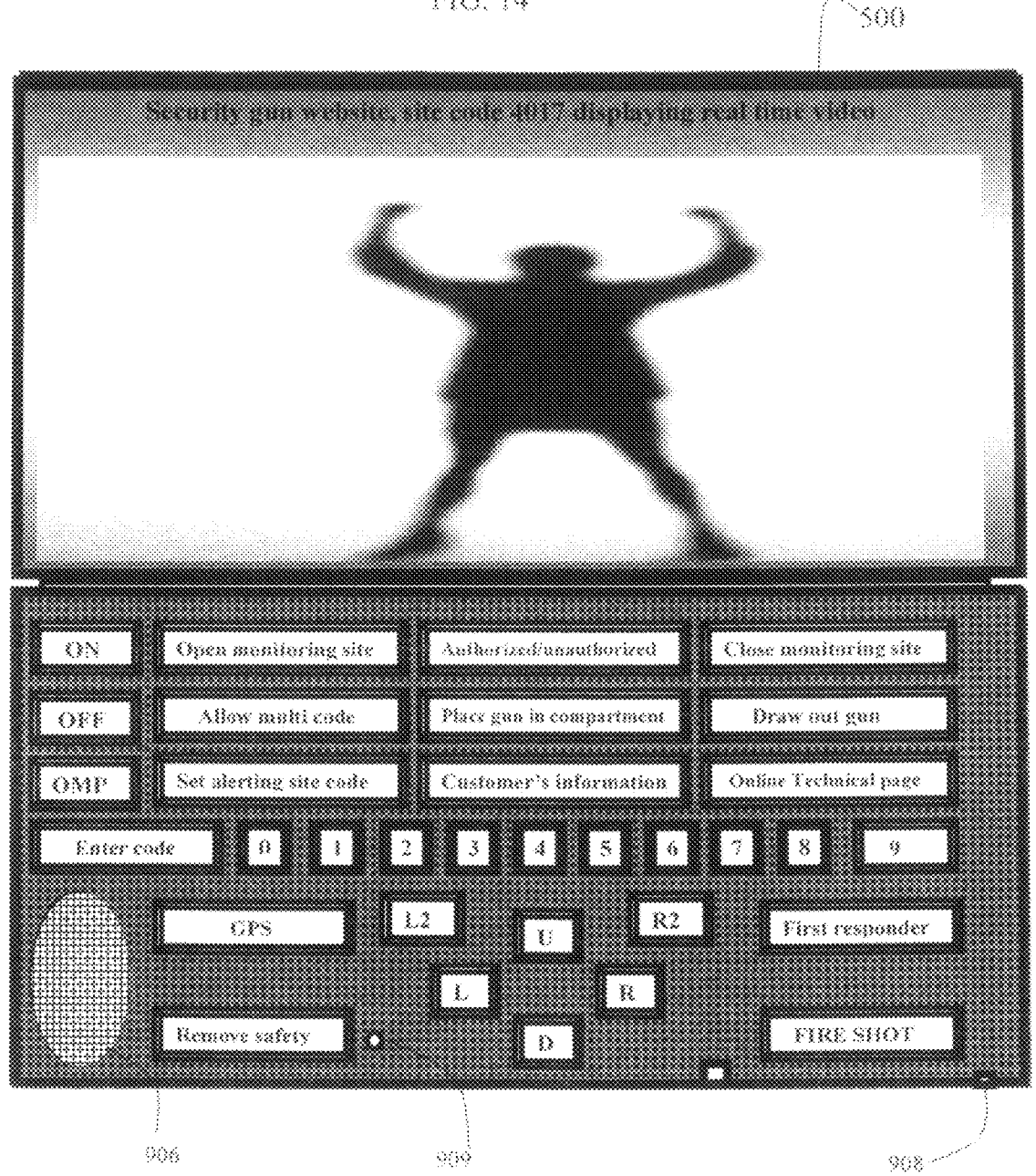

FIG. 14. When the authorized site code button is pushed by the user, the user can see the site code that is authorized in a particular coding system 500G by pushing the authorized site code button, and the site code is automatically displayed on the security gun website. The provider of the security gun 400G may choose to disable the display of the authorized site code, when the authorized site code button is pushed, if the provider does not want the user to see the authorized site codes. FIG. 14. The coding system 500G displays the program, this is your authorized site code, if you want to be authorized to monitor or use any other site code number, please press the service request button to communicate with a supervisor. The coding system 500G can detect any unauthorized site codes. The coding system 500G only allows the site code programmed by the security gun provider. The user can push the SW button on the embodiment of the coding system to enter more than one site code number if the user wants to monitor the location of more than one security gun simultaneously. One person operating one coding system 500G can only be allowed to monitor a minimum of 1 to 6 security guns or more.

Figure 15:
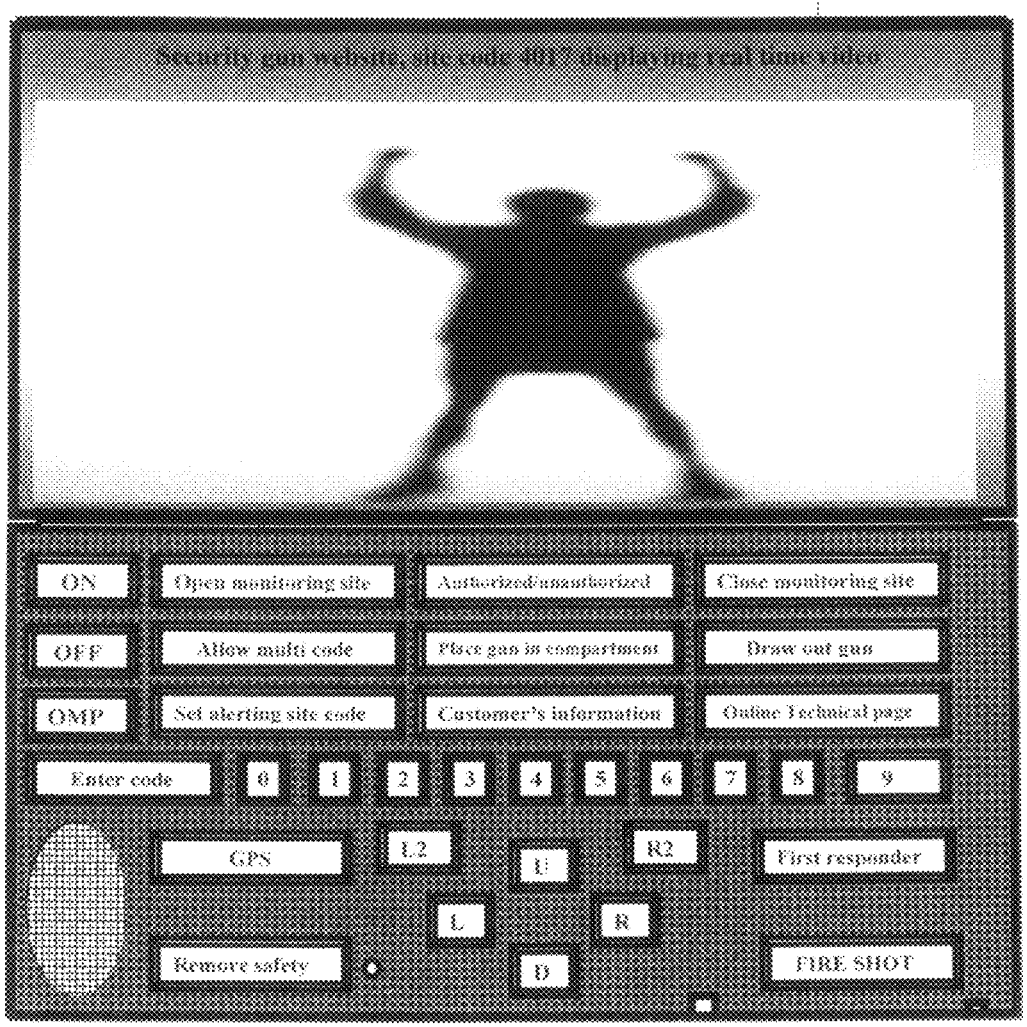

FIG. 15. The coding system 500G displays the program saying security gun website, displaying real time video from the site code 4017. When the user enters the right site code, a real time video of the location of a security gun 400G, captured by the cameras on the embodiment of the security gun 400G is automatically displayed on the monitor of the coding system 500G. The user can see the video captured by two cameras on the embodiment of the security gun 400G, the front camera 302A, and the back camera 302B at the same time on the monitor. Furthermore, the real time video detected by the two cameras is displayed on the coding system simultaneously. See FIG. 15.

Figure 16:
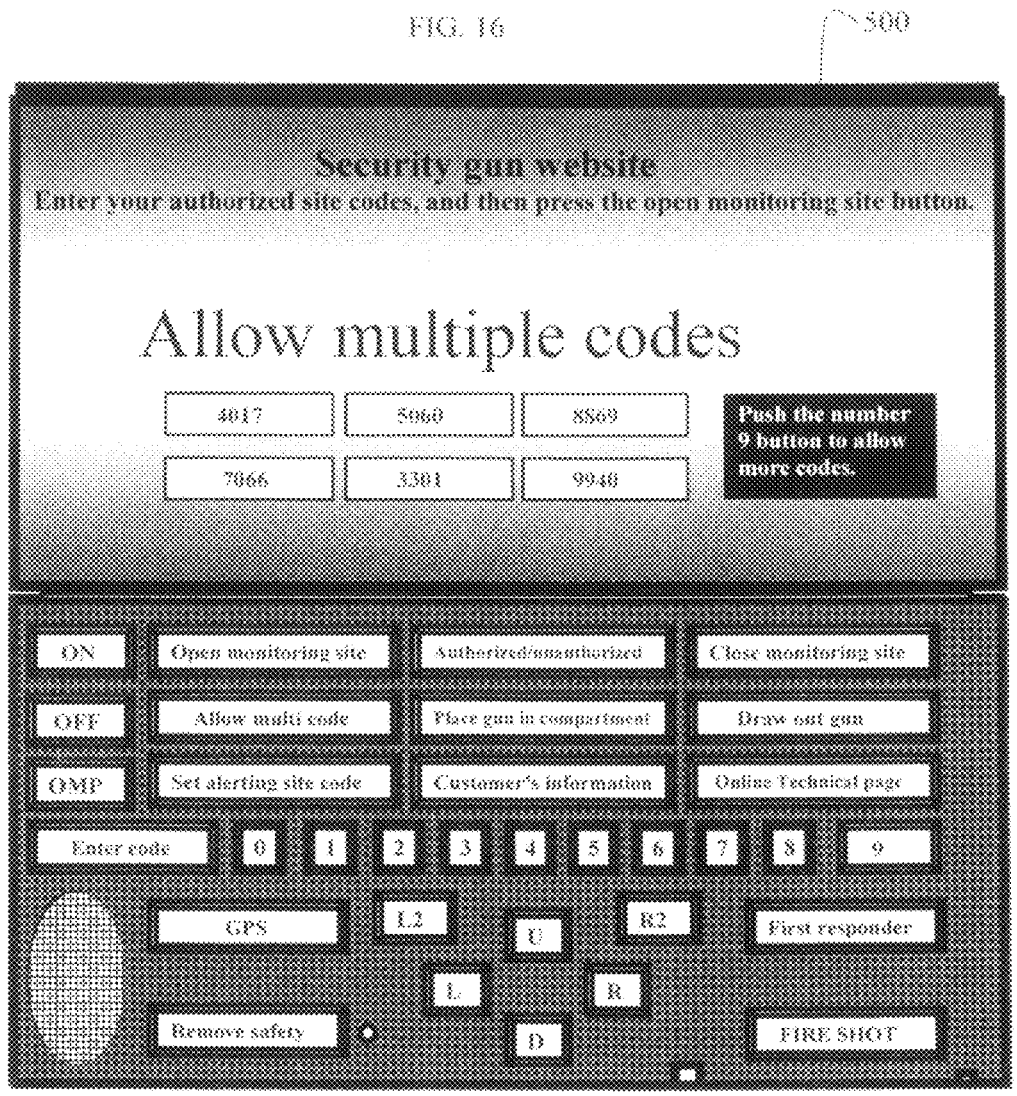

FIG. 16. When the gun 308G is drawn by the user, only the gun camera 309G will start working. See FIG. 16. The user can select the front camera 302A, even if the gun is drawn, by pushing the front camera button, located on the embodiment of the coding system 500G. Then only the front camera 302A will work. See FIG. 17. The user can also operate the gun 308G by using the front camera 302A on the embodiment of the security gun 400G, when firing the gun 308G or monitoring the location of the security gun 400G. The coding system 500G will be built with many special software materials, for example, a software that automatically displays a target guide or an icon that helps to pinpoint a target when the gun 308G is drawn to enhance accurate aiming of shot(s), and many more special software, for example software or icon that will display the exact time and date of any activity captured by the cameras on the embodiment of the gun 308G. Furthermore, when the gun 308G is placed back into the safety compartment 305G, the front camera 302A and back camera 302B on the embodiment of the security gun 400G will automatically start working by detecting videos of the location of the security gun 400G and the videos are displayed on the monitor of the coding system 500G. See FIG. 15.

The embodiment of the security gun 400G is controlled by the user using a safe hand held module also called control module with seven buttons. See FIG. 26. Three buttons labeled ML, MR, and RC in the control module work at all times when pushed by the user. The remaining four buttons labeled RS, FS, MU, and MD only work when the key ON/OFF button on the embodiment of the coding system 500G is pushed by the user. Then the user can make use of any of the four buttons, located on the embodiment of the safe hand held module. The key ON/OFF button is a safety measure that allows the four buttons to work when pushed by the user. The key ON/OFF button is a ON/OFF button that is pushed by the user once to ON and once to OFF, and the action can be repeated by the user to activate or deactivate the four buttons. An LED 909G lights up when the key ON/OFF buttons is in the ON state.

Figure 17:
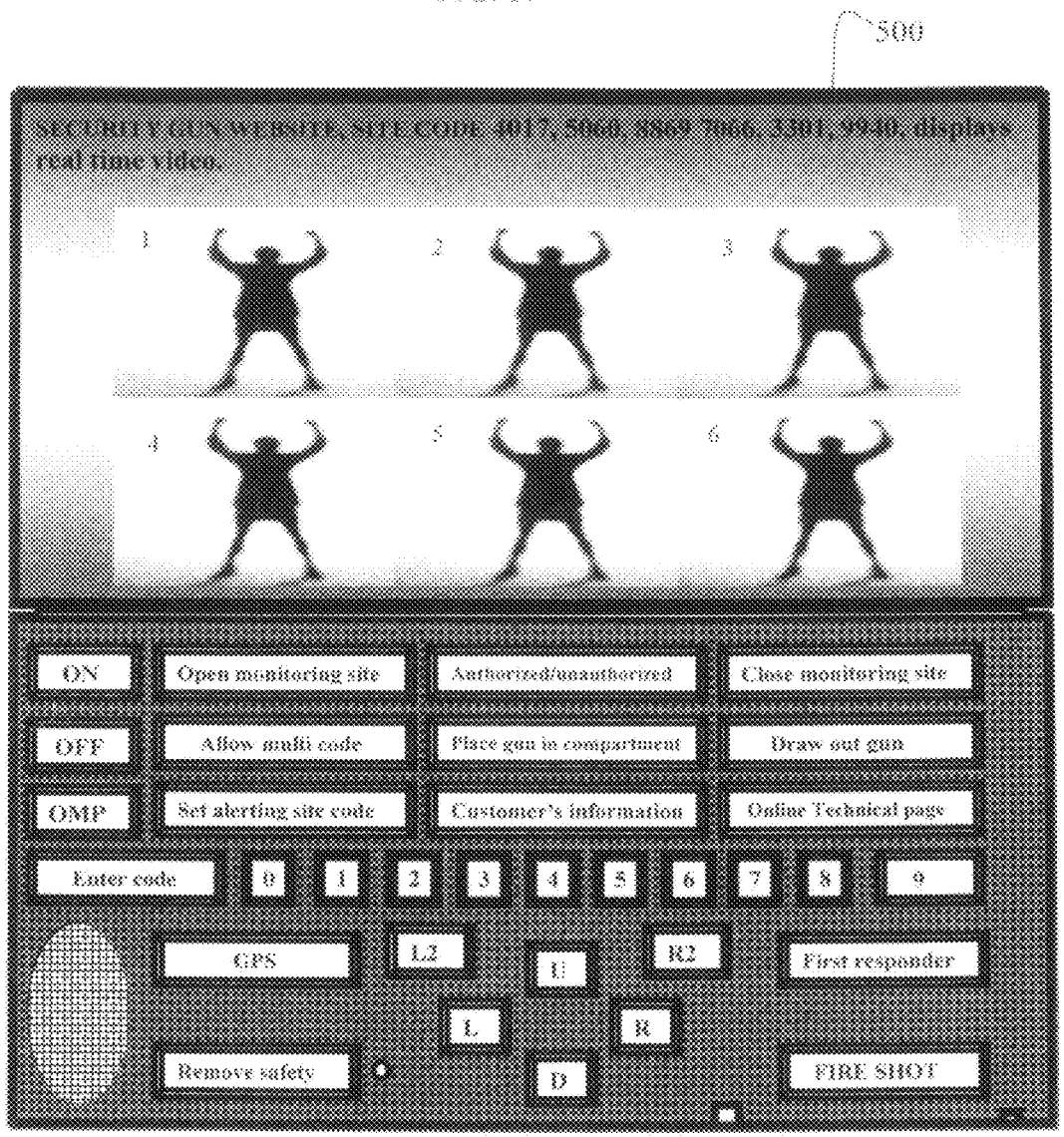
Figure 26:
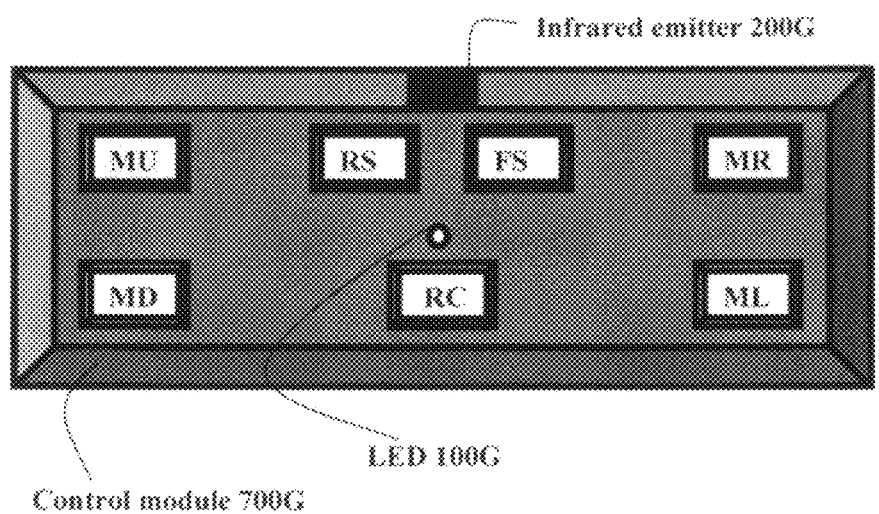
FIG. 26 describes the embodiment of the safe hand held module.

Furthermore, in FIGS. 16 and 17, the coding system 400G displays the program saying security gun website, displaying real time video from the site code 4017. FIG. 26 is the safe hand held module 700G, used for navigating or positioning the gun 308G to any preferred position of the user's choice. The user can fire shot(s) at a suspect by first pushing the key ON/OFF button on the embodiment of the coding system 500G, to allow four special buttons to work, when pushed by the user. The buttons are labeled MU, MD, RS, and FS and they are located on the embodiment of the control module 700G.

When the key ON/OFF button is pushed by the user, the user can now push the MU button to draw out the gun hand 304A to any position or segment upward. The user can also use the MD to position the gun hand 304A to any position or segment downward. These two buttons when operated by the user, position the gun hand 304A at a target. The user can push the remove safety button RS on the embodiment of the safe hand held control module to remove the gun 308G from safety mode. Then the user can push the fire shot button FS to fire shot(s) at the target. The number of shots is based on how many times the user pushes the fire shot button FS and it is also based on the grade of the gun 308G.

The security gun 400G comes in grades. The security gun 400G comes as a semiautomatic or a machine gun.

As a machine gun the user only pushes the fire shot button FS once to fire many shots, and as a semi-automatic gun the user pushes the fire shot button FS once for one shot. The security gun 400G comes as a semiautomatic gun for civil purposes. The security gun 400G will come as a semiautomatic or machine gun for military purposes.

A light emitting diode LED 100G on the embodiment of the safe hand held control module 700G will light up when the remove safety button FS is pushed by the user indicating the ON state. See FIG. 26. Also an LED 909G on the embodiment of the coding system 500G will light up when the key ON/OFF button is pushed by the user. See FIG. 16. A speaker 906G on the embodiment of the coding system 500G receives sound from the location where the security gun 400G is mounted. A headset with microphone can be connected to an input 908G for communicating with anyone in the location of the security gun 400G. The headset can be a wired or a wireless headset that can connect to the coding system 500G wirelessly. The user can place the gun back in its safety compartment 305G by pushing the MD button on the embodiment of the safe hand held control module 700G.

Figure 18:
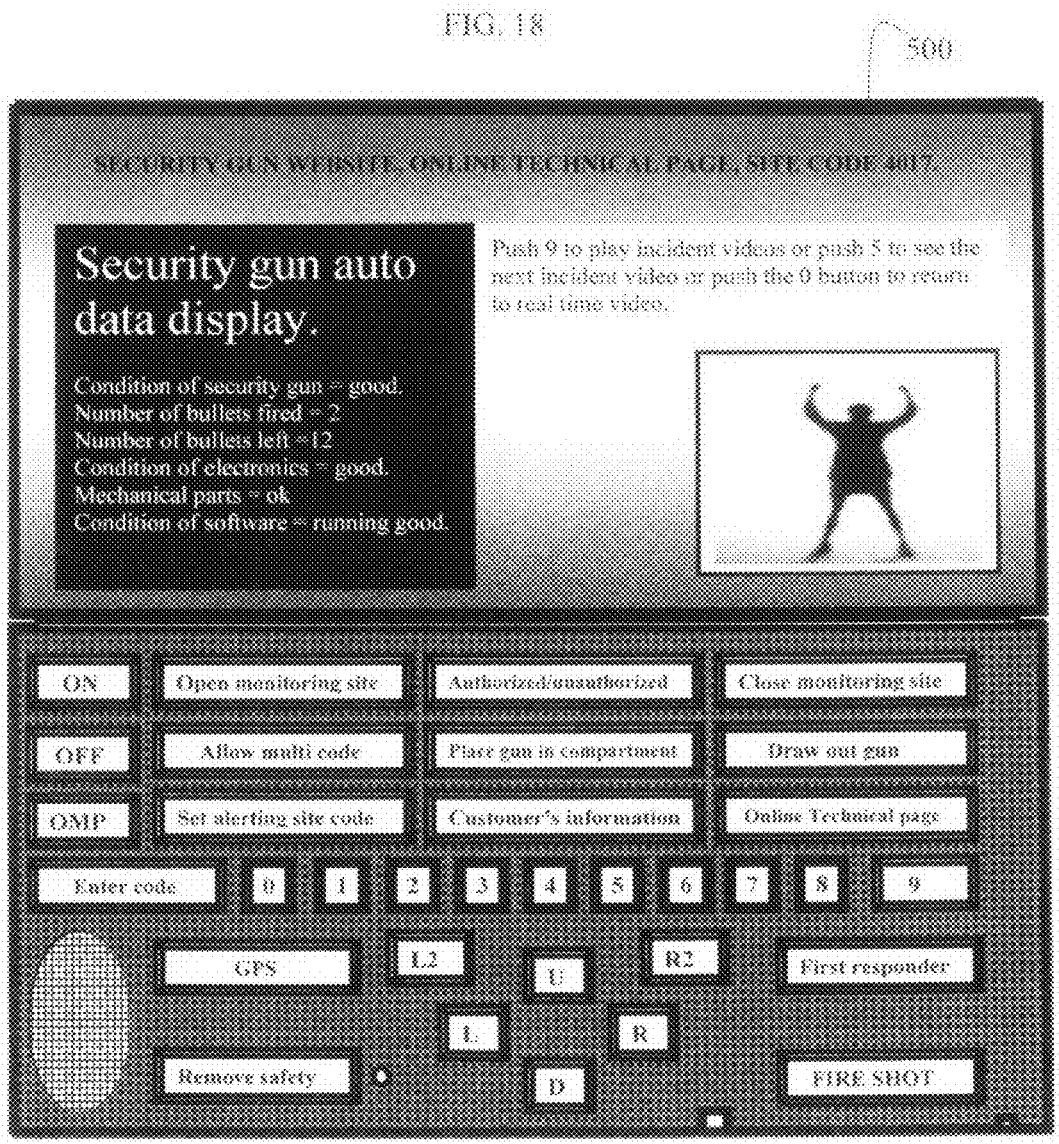

FIG. 18. The user can push the service request button on the embodiment of the coding system 500G to video communicate with a supervisor if the user has any question or need, by making use of the coding system 500G. The video of the user is sent to a coding system 500G used by the supervisor, and the video of the supervisor is displayed on the coding system 500G used by the user. The video is detected by the camera 980G on the embodiment of the coding system 500G used by the supervisor or the user. The sound or voice of the users comes out from the speaker 906G on the embodiment of the coding system 500G, and a microphone 905G detects any sound or voice made by the users of the coding system 500G. The users of the coding system 500G can also make use of a headset connected to the coding system 500G, when communicating with the supervisor or a user at the other end. The headset can be a wire or a wireless headset that can connect to the coding system 500G wirelessly.

The OMP button means operator must push. The provider or a supervisor can set the OMP button so that the person monitoring the site code of a particular security gun 400G must push the button once every 15-30 minutes. If the user does not push the button within that time frame, the coding system 500G will automatically contact the supervisor or the provider by sending message through the security gun website to the provider/supervisor, and then the coding system 500G will shut down automatically. Furthermore, many users can be allowed to monitor a particular site code using many coding systems 500G. When there is an emergency, the first user to push the first responder button located on the embodiment of the coding system 500G is the user that can operate the security gun 400G in the location that the users are monitoring. The user can fire shot(s) by first pushing the key ON/OFF button and then using the safe hand held control module to wirelessly move the embodiment of the security gun 400G to any position of the user's choice. The user can also move the gun hand to any segment or position upward or downward.

The user can move the embodiment of the security gun 400G to turn, move, or spin about 360 degrees on a pole 317G. The security gun 400G moves around when it is mounted on a pole 317G. The user can move the embodiment of the security gun 400G around by pushing the ML or MR button located on the embodiment of the control module 700G, and a special mechanical part or brake system inside the embodiment of the security gun 400G stops and holds the embodiment of the security gun 400G from moving. When the user releases the ML or MR button located on the embodiment of the control module 700G, an electric motor and some electrical and mechanical parts located inside the embodiment of the security gun 400G are connected to the joint area 320G, which is also the pole mount area 320G and 320B. The electric motor enables the embodiment of the security gun 400G to move 360 degrees when the ML or MR button is pushed. The ML button enables the embodiment of the security gun 400G to turn from the left; the MR button enables the embodiment of the security gun 400G to turn from the right.

The user can fire shot(s) at a suspect or a target by first pushing the MU button (see FIG. 26) to draw out the gun hand 304A to any segment or position, then removing safety button RS and then pushing the fire shot button FS to fire shot(s). The remove safety button RS is an additional safety measure to prevent accidental discharge. It must be pushed by the security gun operator before pushing the fire shot button FS. Pushing the fire shot button FS without first pushing the remove safety button RS will result to no shot fired; meaning shots cannot be fired without pushing the remove safety button RS. The laser pointer 311G on the embodiment of the gun 308G automatically comes ON when the gun 308G is drawn.

The coding system 500G can be used for many purposes, for example, for war or for protecting a place or location. It can also be used for training purposes, for example, online gun range that allows people to pay service fees to practice using the coding system to operate the security gun, by shooting at a target in real time in location(s) set up by the provider of the security gun 400G.

Figure 19:
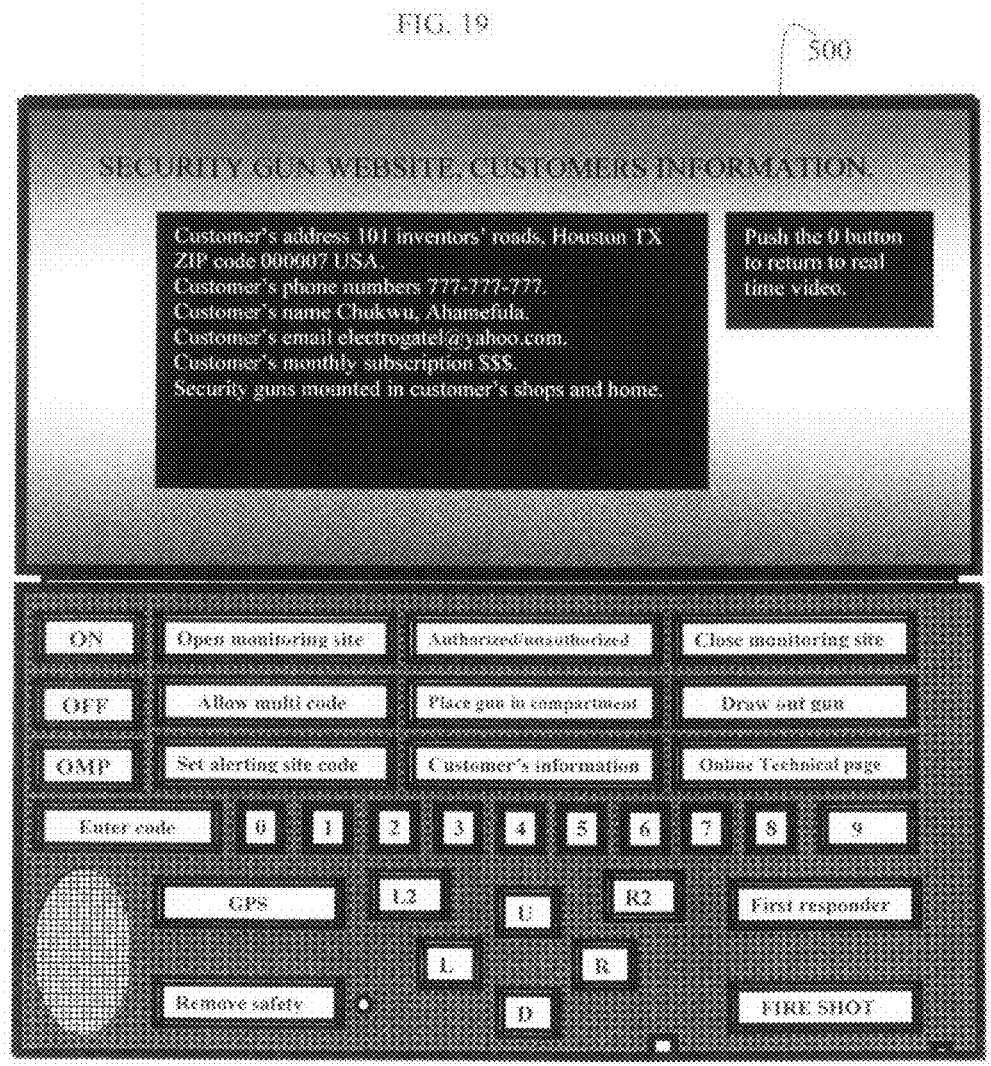

FIG. 19. The user can enter more than one site code by pushing SW button in FIGS. 12 to 14 when the user is asked to enter the authorize site code in the security gun website. See FIGS. 12, 13, and 14. The SW button will allow the user to enter multiple site codes into the security gun website. When entered, and the enter code button is pushed, the user can monitor the location of multiple security guns 400G. In FIGS. 12, 13, and 14, show the program that allows the user to enter multiple site code numbers into the security gun website when the multiple site code numbers are entered. The user must push enter code to reveal multiple real time videos detected by the front camera 302A in the security guns linked to the site codes entered by the user. See FIG. 20.

Figure 20:
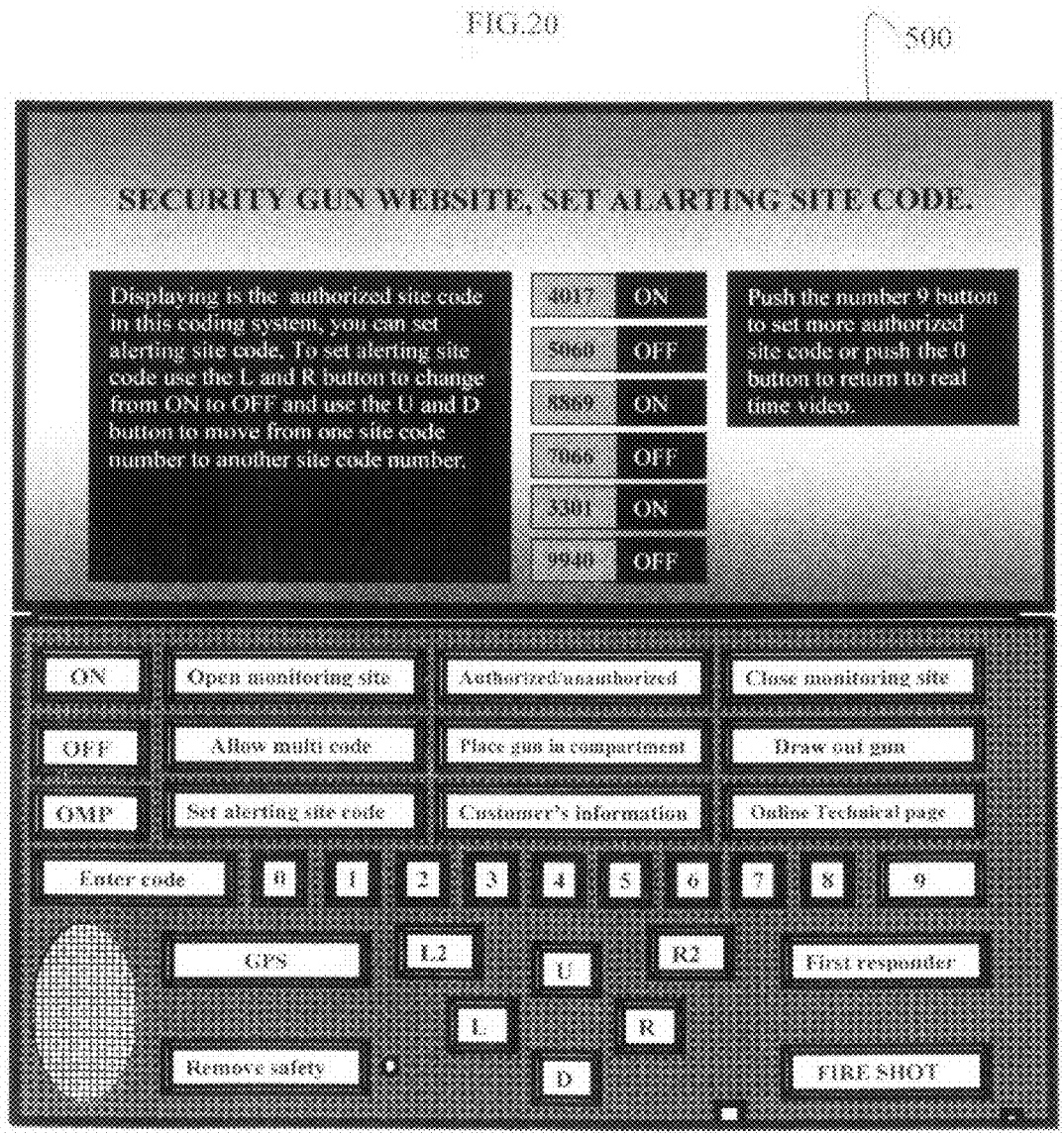

FIG. 20. The coding system displays the program security gun website, you are now monitoring real time videos captured by the cameras on multiple security guns from the site codes 4017, 5060, 8869 7066, 3301, and 9940.

The user monitoring multiple security guns on the coding system 500G can only operate one security gun 400G at a time. The user selects a particular security gun 400G to operate by entering the number displayed with the real time video. The number displayed is entered with the use of the 0 to 9 buttons on the embodiment of the coding system 500G, for example, if the number 5 is displayed with a particular real time video, the number 5 will be pushed selecting that real time video only.

Selecting that real time video only means viewing only that real time video and controlling the security gun 400G in the location that is monitored.

Figure 21:
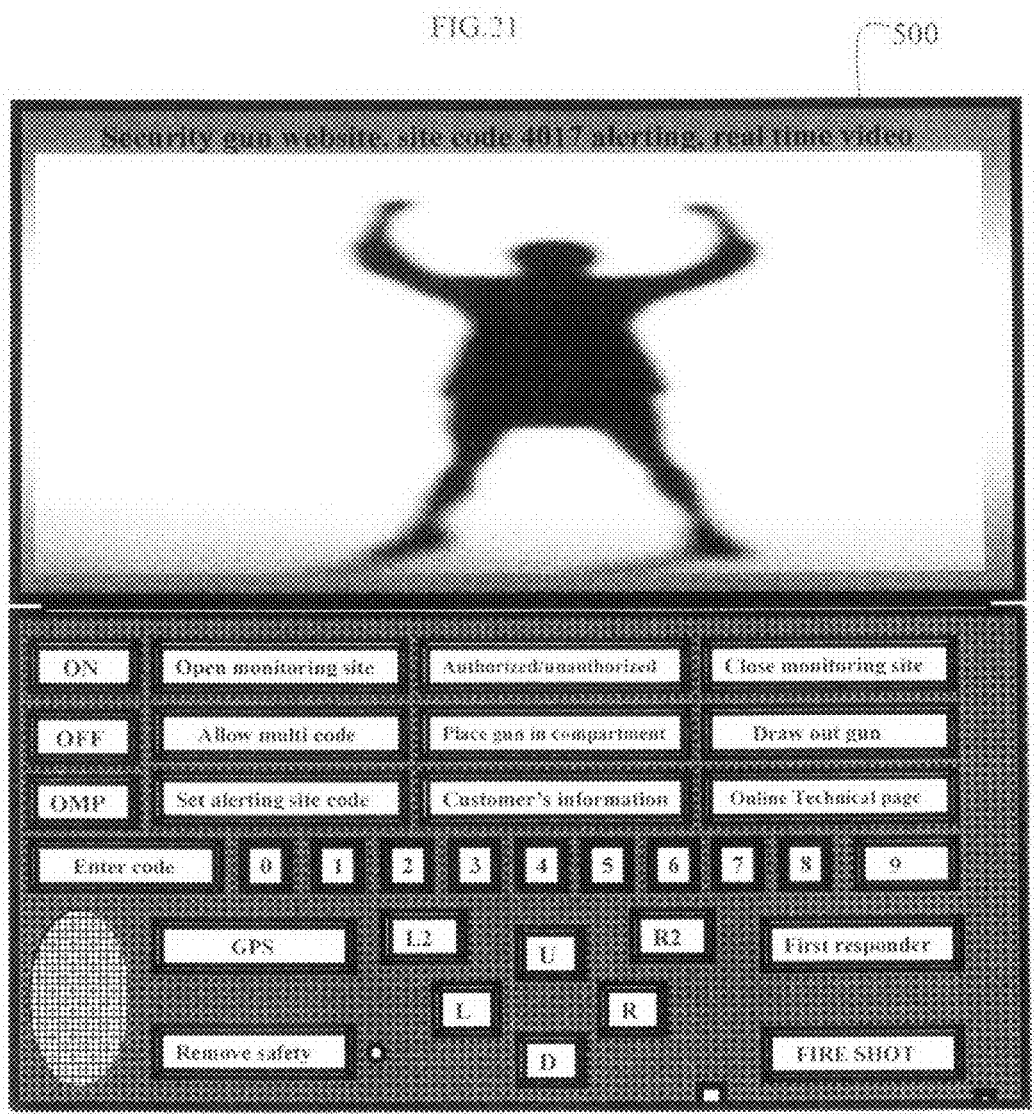

FIG. 21. When the technical page button is pushed by the user. The coding system 500G automatically displays the technical page of the site code 4017 assigned to a particular security gun 400G. The technical page button can be pushed by the user when the user is monitoring any site code, for example, site code 4017. This button when pushed will allow the user to check the information or condition of the security gun 400G. The user can check information like condition of the security gun 400G, number of bullets fired, number of bullets left, condition of electronics, condition of mechanical parts, and the condition of software. The user will be able to see the number of coding system 500G monitoring a particular site code, for example, if there are four coding system 500G monitoring the site code 4017, the coding system 500G will display the sentence, system detect four coding system 500G, monitoring the site code 4017. See FIG. 21. Furthermore, the user will be able to watch any incident videos displayed on the technical page.

Incident videos are videos that are automatically saved in the security gun website whenever the security gun 400G is drawn or fired. The security gun automatically records any incident video captured by any selected camera on the embodiment of the security gun 400G when the gun 308G is drawn out of its safety compartment and the video is stored automatically in the security gun website. The user can push button number 9 to play incident videos or push button number 5 to see the next incident video or push the 0 button to return to the real time video.

Furthermore, in FIG. 21 a program is displayed saying, advance technical page push 6 buttons to enter code below. An authorized user or a supervisor can monitor the coding system used by another user or program some functions in a particular coding system 500G.

Supervisor/user can monitor or set some function in a security gun 400G by using any coding system available to the supervisor/user. An authorized user or supervisor must enter a special numeric code provided by the provider to access the advance technical page.

Figure 22:
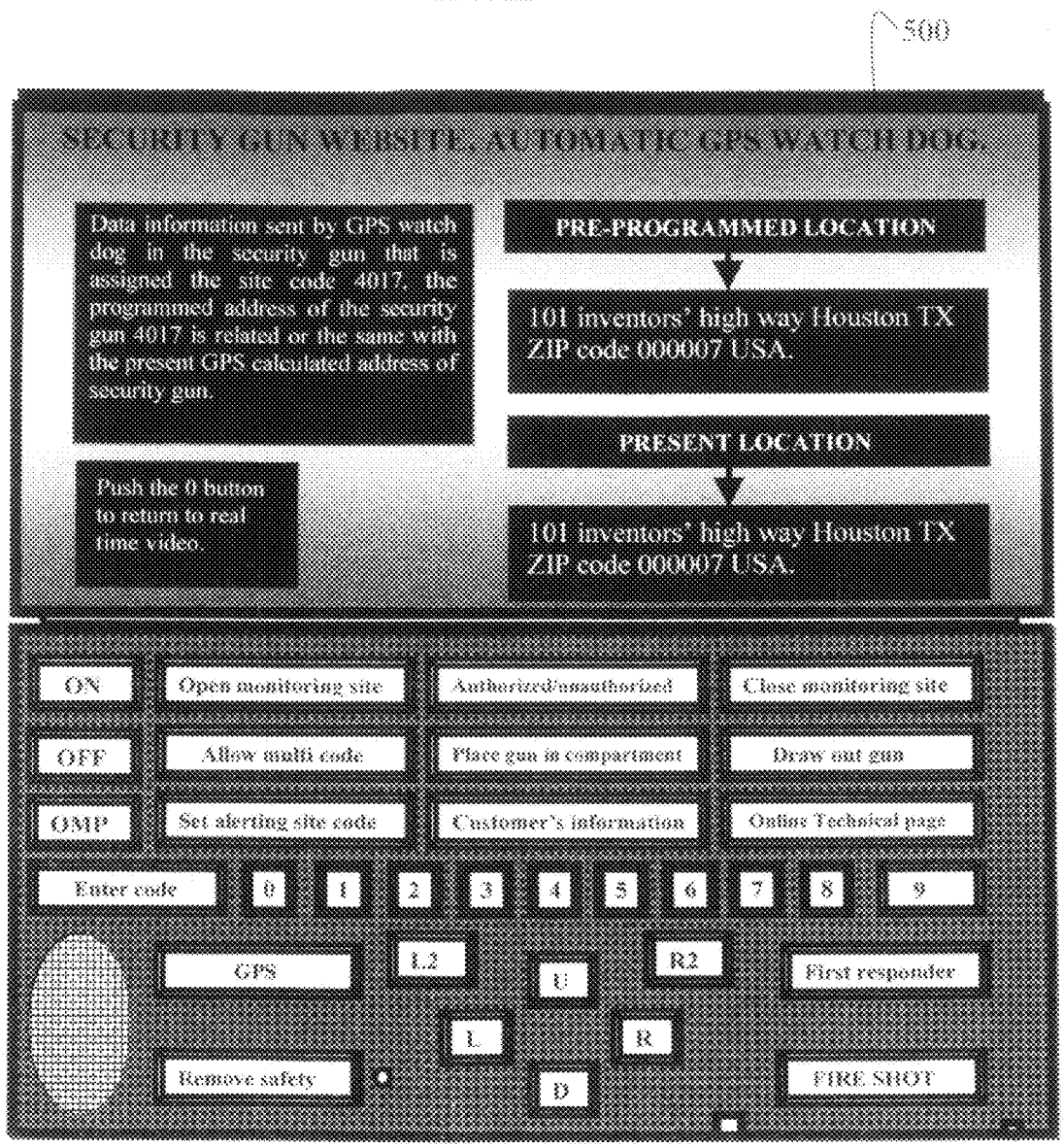

When the supervisor/user enters the right code, the coding system 500G will automatically display FIG. 22. In FIG. 22, the supervisor or authorized user can push the number 2 button to turn ON gun range setting or push the number 6 button to turn OFF gun range setting.

When the gun range setting is turned ON, the embodiment of the security gun 400G that is set will not turn 360 degrees; it can only turn all the way left or all the way right, when controlled by the user.

The supervisor or authorized user can push the number 4 button to turn OFF security gun 400G or push the number 8 button to turn ON security gun 400G. Furthermore, the supervisor or authorized user can push the number 3 button to set or turn ON the OMP button or push the number 5 button to turn OFF the OMP button. See 0042 for explanation of the OMP button.

The supervisor or authorized user can share or connect the display of a coding system 500G to any smart TV monitor. The supervisor or authorized user does that by pushing the number 0 button to search for smart TV then push number 1 button to pair with the smart TV that is detected by the coding system 500G. The coding system 500G can also connect to any special module connected to the smart TV module that can mirror the display on the monitor of the coding system on real time at a high speed to the smart TV.

The cameras on the security gun 400G are color cameras and can be a visible light camera or an infrared camera for night vision, or both.

Figure 23:
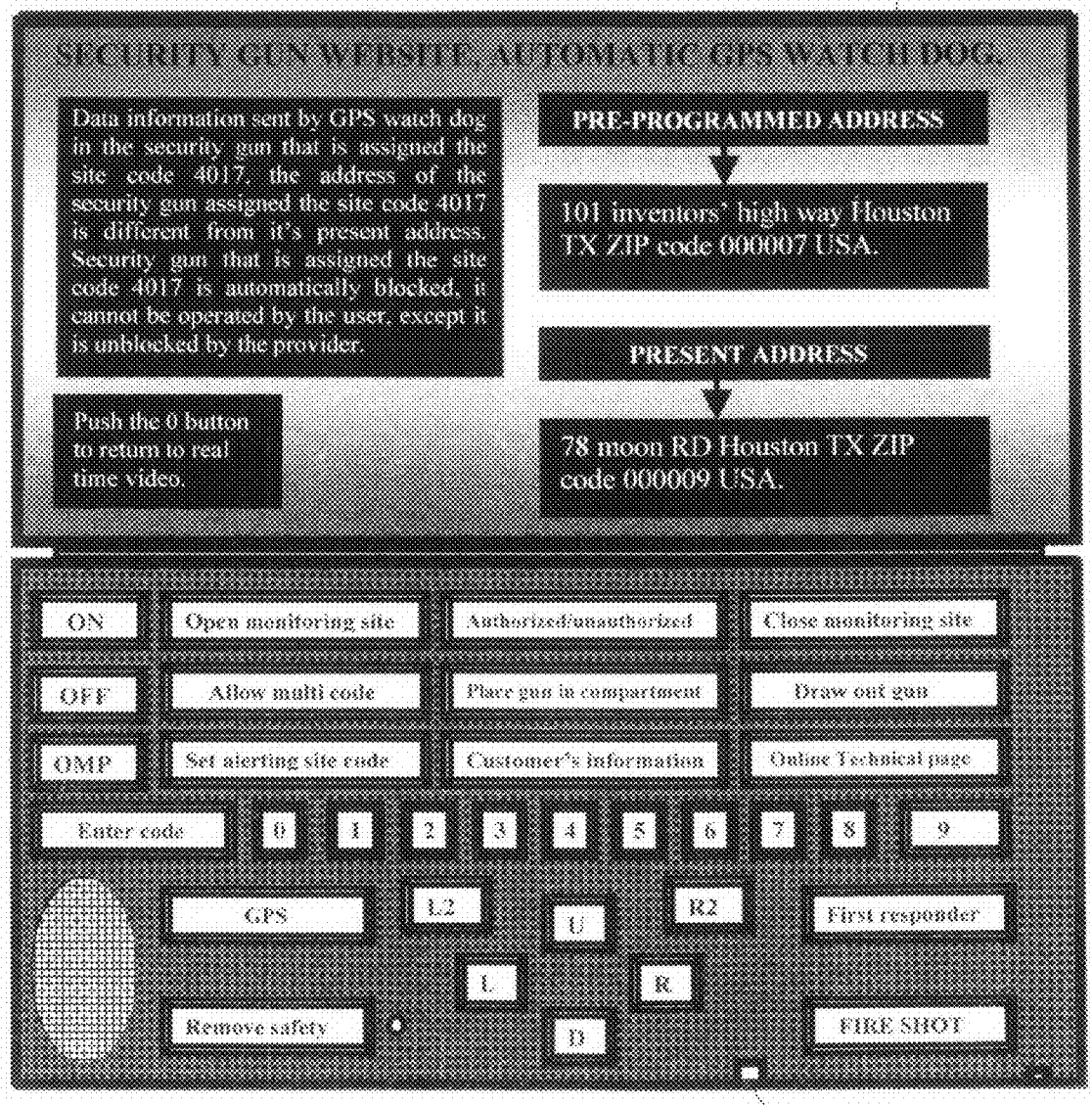

FIG. 23. When the customer's information button is pushed by the user to check customer's information while monitoring a particular security gun or site code. Such customer's information are: name, addresses, email, subscription, etc. The user can also get other information like the location where the security gun 400G is mounted on customer's property. The customer's information has been pre-programmed in the security gun website by the security gun provider with a special computer.

Figure 24:
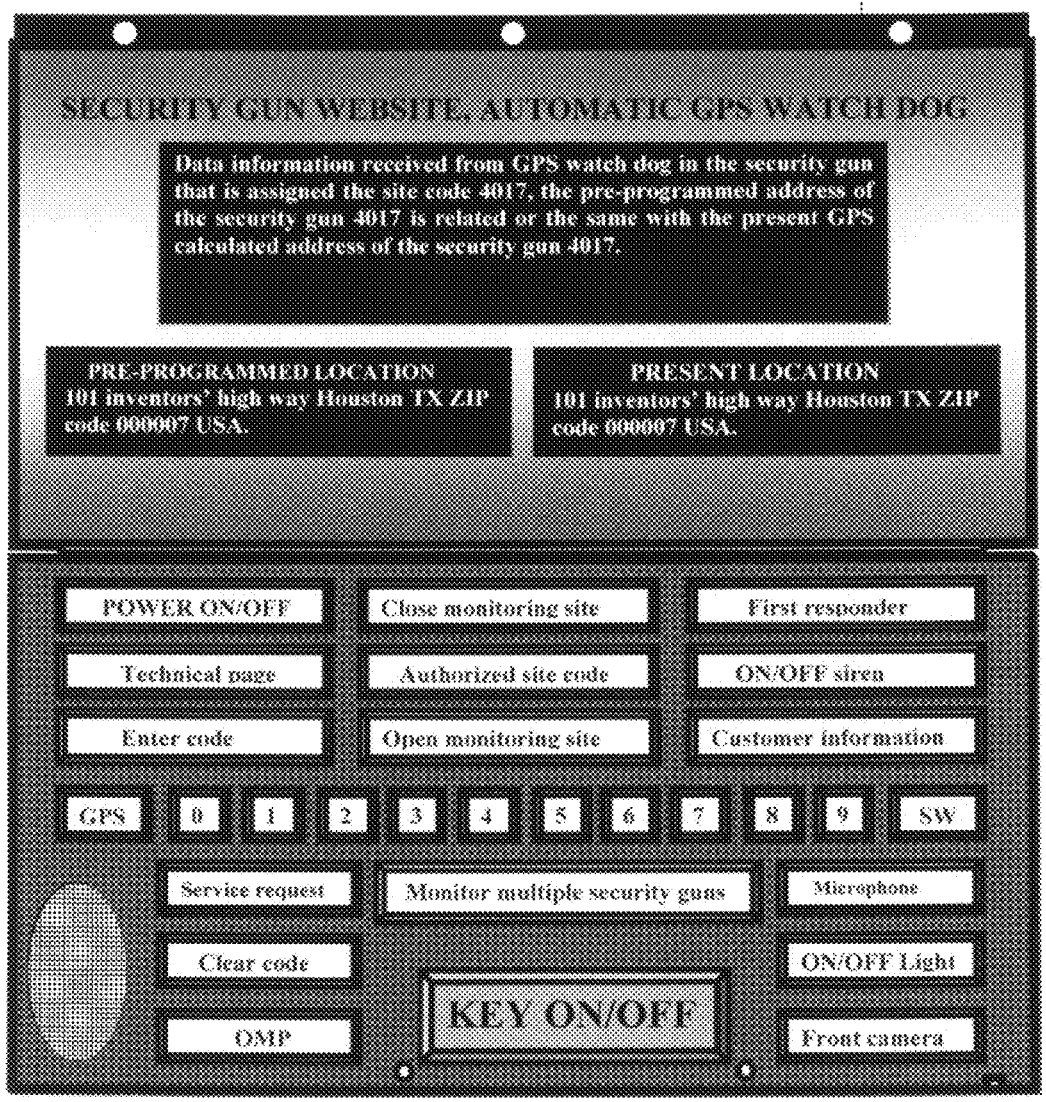

FIG. 24. When the GPS button is pushed, the user can see the pre-programmed address of the security gun 400G that is monitored through the security gun website. A GPS watch dog in the security gun 400G calculates the present address of the security gun 400G and the information is automatically displayed on the monitoring site comparing the pre-programmed address of the security gun 400G with the present address calculated by the GPS watch dog.

If the present address of the security gun 400G does not match or relate to the pre-programmed address of the security gun 400G, the security gun 400G will automatically be blocked from service, meaning that the security gun 400G cannot be operated by the coding system 500G.

FIG. 24. The coding system 500G displays the data information received from GPS watch dog in the security gun that is assigned the site code 4017. The pre-programmed address of the security gun 4017 is related or the same with the present GPS calculated address of the security gun 4017. In this case, the security gun 4017 is not blocked from service. The data is received from the GPS watch dog in the security gun 400G, and it is displayed on the monitor in the coding system 500G.

Figure 25:
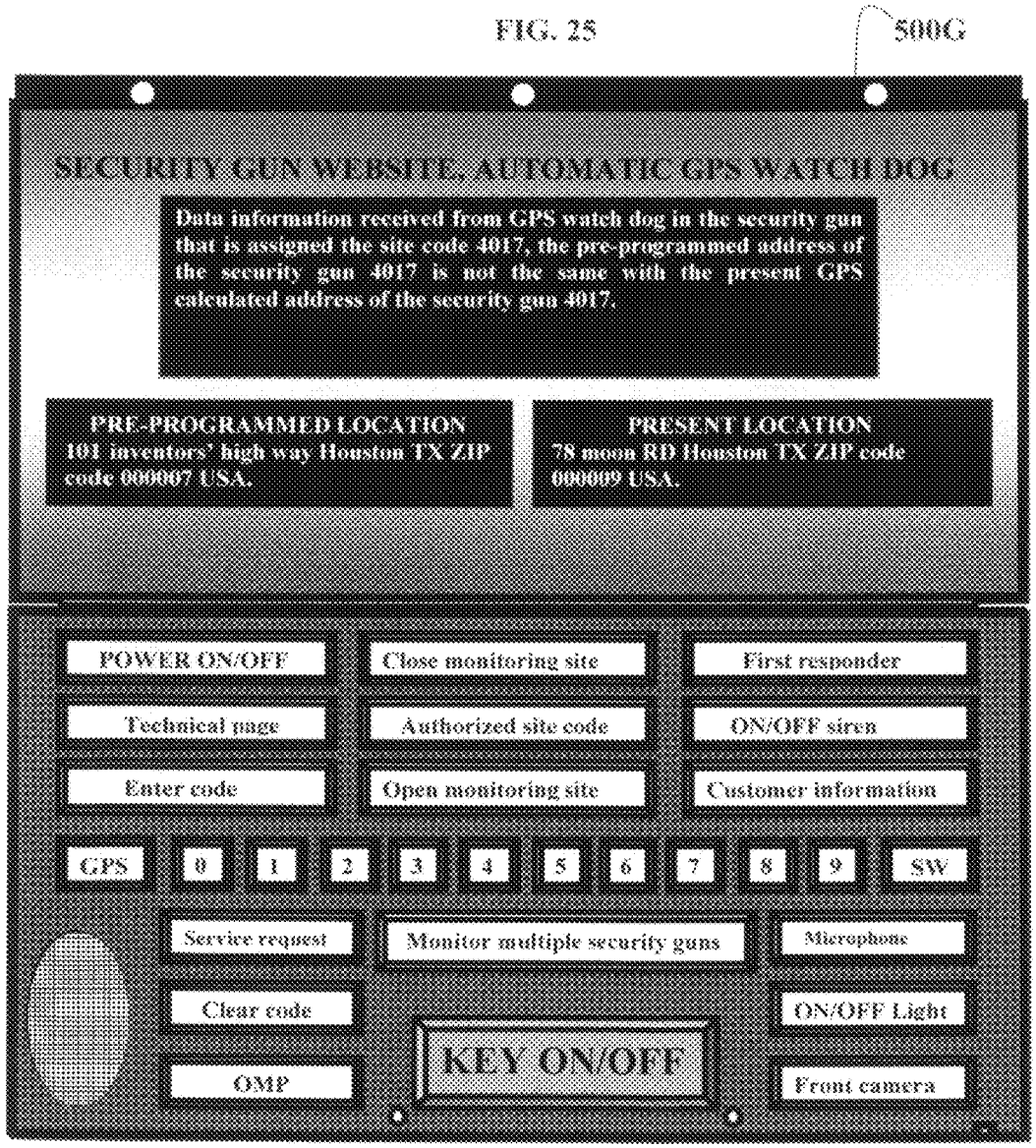

FIG. 25. The coding system 500G displays the data information received from GPS watch dog in the security gun that is assigned the site code 4017. The pre-programmed address of the security gun 4017 is not the same with the present GPS calculated address of the security gun 4017. In this case, the security gun 4017 is blocked from service. The data is received from the GPS watch dog in the security gun 400G and it is displayed on the coding system 500G.

The address or location of the security gun 400G is pre-programmed by the security gun provider. The security gun 400G will automatically be blocked, meaning that the security gun 400G cannot be operated by the user when it is removed from the location or address pre-programmed by the provider, even if there is network in the new location or address. The security gun 400G cannot be controlled anymore, except if it is unblocked by the provider. This is a security measure to stop wrong use of the security gun 400G.

The security gun 400G may be owned or leased by users. The security gun 400G is monitored by a security agent using the coding system 500G in a company building.

The security gun 400G can also be monitored by a user that is licensed or permitted to operate or monitor the security gun 400G with the use of the coding system 500G from any location.

The security gun 400G is tracked by GPS or other position sensing devices. If the user wants to change the location or address of the security gun 400G, the user must contact the security gun 400G provider to change the security gun 400G to the new address or location without any problem. User of the security gun 400G will pay subscription fees to the provider daily, weekly, biweekly, or monthly to continue to enjoy the safety the security gun provides on their property.

Whenever the user operating the coding system 500G pushes any of the following buttons: customer's information, technical page, GPS, authorized site code, service request, and the user wants to return to the real time video the user had been monitoring, the user should push the front camera button or the monitor multiple security gun button on the embodiment of the coding system 500G to return to the real time video(s) that is displayed on the site code(s) the user is monitoring. The user can close a monitoring site by pushing the close monitoring site button. The coding system 500G is turned OFF by pushing the power ON/OFF button on the coding system 500G.

Therefore, most help information on how to use the coding system 500G is automatically displayed on the monitor in the coding system 500G, so authorized users will not have any difficulties using the coding system 500G.

FIG. 26 is an embodiment of the safe hand held control module 700G used for controlling the security gun 400G. The control module 700G is safe because the user can navigate or move the embodiment of the security gun 400G without mistakenly drawing the gun 308G or firing the gun 308G. This is because of an inbuilt key ON/OFF button on the coding system 500G. Four buttons labeled MU, MD, RS, and FS on the embodiment of the safe hand held module will not function when pushed by the user, until the user pushes the key ON/OFF button, otherwise the user can only make use of three button labeled, ML, MR, and RC on the embodiment of the control module 700G. The key ON/OFF button is a safety button.

The remaining button labeled MU, MD, RS, and FS will function when the user pushes the key ON/OFF button located on the embodiment of the coding system 500G. The ML button when pushed is used for moving the embodiment of the security gun to any degree left or 360 degrees around on a pole. The MR button, when pushed is used for moving the embodiment of the security gun to any degree right or 360 degrees around on a pole. The MU button when pushed is used for drawing out the gun to any segment or position upward.

The MD button when pushed is used for moving the gun to any segment or position downward. It is also used to move the gun to it safety compartment. The remove safety button RS when pushed is used for removing the gun 308G from safety mode, and works as an additional safety button. The fire shot button FS is used for firing shot(s). A record button RC can be pushed by the user at any time to record any activity captured by the front camera or the front and back cameras on the embodiment of the security gun 400G, even if the gun is not drawn. The user can push the record button RC a second time to stop recoding. A recording sign will appear on the monitor in the coding system when recording.

The recorded video is automatically stored in the security gun website. All videos stored in the security gun website can only be deleted by the security gun provider using a special computer. The control module 700G work wirelessly when operated by the user by sending code signals through an infrared emitting diode 200G. The code signal is detected by infrared detectors 978G and 979G on the embodiment of the coding system to operate a function. See FIG. 16. The control module 700G is powered by a 3 volt battery. It is light weight and easy to hold with both hands. Furthermore, the safe hand held module is special on its own. Other marketed navigating device for example, a joy stick or a navigating pad that is programmable can be adopted for use, as a hand held module for control and for operation by connecting with the coding system wirelessly. The joy stick or navigation pad must come with programmable buttons and can be connected with the coding system automatically.

FIG. 27 describes a gun range, set up by the provider of the security gun 400G. Users can practice using the security gun 400G in real time from anywhere using the coding system 500G. The provider will charge a service fee to connect users to a security gun 400G of their choice. The security gun 400G will be loaded with bullets and ready for use. The security gun 400G will be set to operate in the gun range mode because most gun ranges will not allow people to shoot 360 degrees in the range.

FIG. 27 shows a security gun 400G shooting at a target in real time in a location set up by the provider or an agent that provides the service of the security gun 400G. The target used in the real time gun range will not be a living thing.

Furthermore, FIG. 27 shows a target on a pole stand 600G. The pole stand 600G can come with a handle to move or carry the target to any position or location. FIG. 27 also shows the security gun 400G on a pole stand 800G. The pole stand 800G can come with a handle to move or carry the security gun 400G to any location. The gun range can also be designed to come in many other hi-tech patterns or forms.

Furthermore, the coding system 500G and the security gun 400G can be designed by the manufacturer to use GSM network and a SIM-card for network connection. The security gun 400G will sound a siren/alarm when the ON/OFF siren button on the coding system 500G is pushed once by the user to scare or alert suspect/suspects in the location of the security gun 400G. The user can turn OFF the siren by pushing ON/OFF siren button once again. This action can be repeated to turn ON or OFF the siren in the security gun 400G. The flashing light on the embodiment of the security gun 400G will flash two or three colors of light when the ON/OFF light button on the embodiment of the coding system 500G is pushed by the user once to scare or alert suspect(s) in the location of the security gun 400G. The user can turn OFF the flashing light by pushing the ON/OFF light button once again. This action can be repeated to turn ON or OFF the flashing light on the embodiment of the security gun 400G. The user can push the microphone button on the embodiment of the coding system 500G at any time to communicate with anyone in the location of the security gun 400G even if the gun 308G is not drawn. The voice of the user is detected by the microphone 905G in the coding system, or in a headset connected to the coding system 500G. The voice of the user is transmitted through the security gun website in real time to be received by the security gun 400G. The voice of the user of the coding system 500G will sound from the speaker on the embodiment of the security gun 400G instantly. The user can push the microphone button to ON or OFF voice communication from the coding system 500G to the security gun(s) 400G that is monitored.

The user can zoom or magnify a video image captured by the front camera 302A or gun camera 309G on the embodiment of the security gun 400G, by pushing any of the numeric buttons on the embodiment of the coding system 500G to zoom in or out at different magnification levels. The zooming action will occur when the user is monitoring the location of a security gun 400G with the use of the front camera 302A or the gun camera 309G on the embodiment of the security gun 400G.

The security gun 400G cannot be fired by a human hand directly holding the gun 308G. The security gun 400G comes as a semiautomatic gun 308G for civil use or a machine gun and semiautomatic gun for military use 308G. The coding system 500G and the security gun 400G are powered by a rechargeable battery or an alternate current. Other special energy sources can be adopted. The gun 308G comes as an electrical or mechanical triggered gun, or both. The gun 308G is inserted into the hand by the manufacturer and it is properly installed to the gun hand by welding or by special screws holding the gun to the gun hand. Some special electrical wires connecting to the camera 309G, the laser pointer 311G, and some mechanical parts inside the gun hand 304B are sent like veins through a pipe hole inside the gun hand 304A. The wire supply power to the camera 309G on the gun, the laser pointer 311G, and some mechanical parts. Other special wires also pass through the gun hand 304G. The mechanical parts inside the gun hand 304B move to trigger the gun 308G mechanically or by electrical charge that will produce enough heat or spark to fire the bullet in the gun 308G.

The security gun can come as a mechanically triggered gun, meaning that the bullets in the gun 308G are ignited by the movement of internal parts that fire the bullets. The security gun 400G can also come as an electrical gun 308G, meaning that the bullets in the gun 308G are ignited by electrical charge not the movement of the internal parts that trigger or ignite the bullets.

The security gun 400G comes in any size and shape. The security gun 400G will come in any size caliber gun 308G. The security gun 400G will be built with special software and hardware materials, which include special electronic circuits built on a circuit board, special electronics circuits which include a Wi-Fi transceiver, GSM transceiver, GPS transceiver cameras, and many other special electronics circuits that are built on a circuit board with special components like microchips, resistors, capacitors, transistors, microprocessors, and other special electronics components. Furthermore, the security gun will be built with special electrical and mechanical materials, which include electric motors, cranks, joints, bearings, and many more mechanical and electrical parts. The embodiment of the security gun 400G is built with metal, springs, plastic, and other special materials.

The safe handheld control module 700G will be built with special electronic components built on a circuit board, for example, microchips, transistors, infrared emitting diode, capacitors, and many more electronic parts and components. The embodiment of the control module will be built with plastic and other special materials.

The coding system comes in any size and shape that allows clear monitoring of the LCD display on it embodiment. The coding system comes as a flip monitor, a flip-able coding system, meaning that the embodiment of the coding system can be folded and carried by the user to any location as a laptop or a desktop device. The coding system 500G will be built with many special software and special electronic circuits built on a circuit board, special electronic circuits which include Wi-Fi transceiver, GSM transceiver, GPS transceiver, and many other special electronic circuits, that will be built with special components like LED, microphone, infrared detectors, microchips, transistors, capacitors, microprocessors, liquid crystal display LCD, and many other special electronic components and materials. The embodiment of the coding system 500G will be built with plastic and other special materials.

I claim:

1. A gun system comprising;
a body;
a gun hand pivotally attached to the body at one end and rigidly attached to a gun at a second end;
a safety compartment attached to a side of the body, the safety compartment forming a cavity configured to receive the gun therein;
a flip gate pivotally attached to an opening of the safety compartment and configured to conceal the gun within the safety compartment;
a camera secured to the second side of the body;
a pole mount rigidly attached to the body and configured to secure the body to a support structure; and
an internet connectable module operably associated with an electric motor associated with the gun hand, the internet connectable module being configured to receive commands from a remote monitoring site and configured to control movement of the gun via the electric motor and gun hand;
wherein the camera is configured to relay real-time images to the remote monitoring site.

2. A gun system comprising;
a body;
a gun hand pivotally attached to a body at one end and rigidly attached to a gun at a second end;
a safety compartment attached to a side of the body, the safety compartment forming a cavity configured to receive the gun therein;
a microphone attached to a second side of the body;
a camera secured to the second side of the body;
a laser pointer secured to the second side of the body;
a loud speaker secured to the second side of the body;
a pole mount rigidly attached to the body and configured to secure the body to a support structure; and
an internet connectable module operably associated with an electric motor associated with the gun hand, the internet connectable module being configured to receive commands from a remote monitoring site and configured to control movement of the gun via the electric motor and gun hand; and
a GPS system;
wherein the camera is configured to relay real-time images to the remote monitoring site;
wherein the microphone and the loud speaker are configured to relay sound to a person proximate to the body; and
wherein the GPS system is configured to detect the location of the body, and if outside a predetermined location, deactivates the gun.

3. A gun system comprising;
a body;
a gun hand pivotally attached to a body at one end and rigidly attached to a gun at a second end;
a safety compartment attached to a side of the body, the safety compartment forming a cavity configured to receive the gun therein;
a flip gate pivotally attached to an opening of the safety compartment and configured to conceal the gun within the safety compartment;
a microphone attached to a second side of the body;
a camera secured to the second side of the body;
a loud speaker secured to the second side of the body;
a siren secured to the second side of the body;
flashing lights secured to the second side of the body;
a pole mouth rigidly attached to the body and configured to secure the body to a support structure;
an inbuilt battery disposed within an inner area of the support structure;
an internet connectable module operably associated with an electric motor associated with the gun hand, the internet connectable module being configured to receive commands from a remote monitoring site and configured to control movement of the gun via the electric motor and gun hand;
wherein the camera is configured to relay real-time images to the remote monitoring site where the images are stored when the gun is drawn; and wherein
the microphone and the loud speaker are configured to relay sound to a person proximate to the body.

* * * * *